(12) United States Patent
Batchelor et al.

(10) Patent No.: US 12,296,872 B2
(45) Date of Patent: May 13, 2025

(54) METHOD AND APPARATUS FOR DETERMINING A POSITION OF A VEHICLE

(71) Applicant: HITACHI RAIL GTS UK LIMITED, London (GB)

(72) Inventors: Andrew Batchelor, Reading (GB); Douglas Watson, Reading (GB)

( * ) Notice: Subject to any disclaimer, the term of this patent is extended or adjusted under 35 U.S.C. 154(b) by 837 days.

(21) Appl. No.: 17/297,006

(22) PCT Filed: Nov. 28, 2019

(86) PCT No.: PCT/EP2019/082929
§ 371 (c)(1),
(2) Date: May 26, 2021

(87) PCT Pub. No.: WO2020/109476
PCT Pub. Date: Jun. 4, 2020

(65) Prior Publication Data
US 2022/0024505 A1  Jan. 27, 2022

(30) Foreign Application Priority Data
Nov. 30, 2018 (GB) .................................. 1819619.6

(51) Int. Cl.
| | |
|---|---|
| *B61L 25/02* | (2006.01) |
| *G01C 21/16* | (2006.01) |
| *G01C 21/20* | (2006.01) |

(52) U.S. Cl.
CPC ........... *B61L 25/025* (2013.01); *B61L 25/023* (2013.01); *G01C 21/1652* (2020.08);
(Continued)

(58) Field of Classification Search
CPC .... B61L 25/025; B61L 25/023; B61L 25/021; B61L 25/026; G01C 21/1652;
(Continued)

(56) References Cited

U.S. PATENT DOCUMENTS

| | | | |
|---|---|---|---|
| 2004/0140405 A1* | 7/2004 | Meyer | B61L 25/028 246/122 R |
| 2006/0293844 A1 | 12/2006 | Sawaki | |

(Continued)

FOREIGN PATENT DOCUMENTS

| | | | | |
|---|---|---|---|---|
| CN | 107690567 A | * | 2/2018 | ............ G01C 21/16 |
| EP | 1457946 | | 9/2004 | |

(Continued)

OTHER PUBLICATIONS

GB Combined Search and Examination Report for Corresponding Application No. GB1819619.6, completed on May 31, 2019—8 pages.

(Continued)

*Primary Examiner* — Zachary L Kuhfuss

(57) ABSTRACT

A computer-implemented method of determining a position of a vehicle 10 within a transport network comprises: obtaining track geometry data indicating track geometry of at least a part of the transport network; determining, based upon the track geometry data, that the vehicle is approaching a junction; determining, based upon the track geometry data, a plurality of route options from the junction; generating a plurality of Bayesian estimation filter algorithms each associated with a respective one of the plurality of route options and configured to estimate a position of the vehicle based upon the track geometry data indicative of the associated route option, wherein the plurality of Bayesian estimation filter algorithms are configured to output data indicative of probabilities of the vehicle taking the associated route options; monitoring the output of the plurality of Bayesian estimation filter algorithms as the vehicle passes through the junction; and determining the route option taken by the vehicle by selecting one of the plurality of route options (Continued)

which presents the highest probability based upon the output of the plurality of Bayesian estimation filter algorithms.

20 Claims, 7 Drawing Sheets

(52) U.S. Cl.
CPC .......... *G01C 21/1656* (2020.08); *G01C 21/20* (2013.01); *B61L 25/021* (2013.01); *B61L 25/026* (2013.01)

(58) Field of Classification Search
CPC .... G01C 21/1656; G01C 21/20; G01C 21/30; G01C 21/005; G01C 21/12
See application file for complete search history.

(56) References Cited

U.S. PATENT DOCUMENTS

| | | | |
|---|---|---|---|
| 2011/0129122 A1 | 6/2011 | Stählin et al. | |
| 2018/0045832 A1 | 2/2018 | Ibrahim et al. | |

FOREIGN PATENT DOCUMENTS

| | | | |
|---|---|---|---|
| EP | 2664894 | 11/2013 | |
| EP | 3339807 A1 * | 6/2018 | ............. G01C 21/30 |
| EP | 3358079 A1 * | 8/2018 | ............. A01D 90/10 |
| JP | 2009/042179 | 2/2009 | |
| JP | 2018/059814 | 4/2018 | |
| WO | WO 2008/009966 | 1/2008 | |
| WO | WO 2010/111118 | 9/2010 | |

OTHER PUBLICATIONS

PCT International Search Report and Written Opinion for corresponding PCT Application No. PCT/EP2019/082929, mailed on Apr. 7, 2020—15 pages.
Van Der Merwe et al., Sigma-point Kalman filters for nonlinear estimation and sensor-fusion: Applications to integrated navigation, AIAA Guidance, Navigation, and Control Conference and Exhibit, Providence, Rhode Island, Aug. 16-19, 2004—30 pages.
Van Der Merwe et al., Sigma-point Kalman filters for probabilistic inference in dynamic state-space models, proceedings of the Workshop on Advances in Machine Learning, Montreal, Canada, Jun. 8-11, 2003—397 pages.
Hall, "Lie Groups, Lie Algebras, and Representations: An Elementary Introduction," Graduate Texts in Mathematics 222 (2nd ed.), Springer, 2015, Abstract Only—3 pages.
Iwasawa, On the representation of Lie algebras, Jap. J. Math. 19, (1948), pp. 405-426, Abstract Only—1 page.
Hertzberg et al., "Integrating Generic Sensor Fusion Algorithms with Sound State Representations through Encapsulation of Manifolds," Information Fusion, vol. 14, Issue 1, Jan. 2013, pp. 57-77—31 pages.
Fletcher et al., "Statistics of Shape via Principal Component Analysis on Lie Groups," Proceedings of IEEE Computer Society Conference on Computer Vision and Pattern Recognition, 2003, pp. 95-101—7 pages.
PCT International Preliminary Report on Patentability for corresponding PCT Application No. PCT/EP2019/082929, issued on May 25, 2021—10 pages.
European Office Action for corresponding Application No. 19832846.0-1009, dated Feb. 6, 2023, 7 pages.
Arunasish et al., "State Inequality Constraint Based Method for Rail Navigation", Annual IEEE India Conference (INDICON), 2010, 6 pages.
Jong-Sun et al., "Development of a map matching method using the multiple hypothesis technique", 2001 IEEE Intelligent Transportation Systems Conference Proceedings, Aug. 2001, pp. 23-27.

* cited by examiner

METHOD AND APPARATUS FOR DETERMINING A POSITION OF A VEHICLE

This application is a national phase application of International Application No. PCT/EP2019/082929 filed on Nov. 28, 2019, which, in turn, is based upon and claims the right of priority to UK Patent Application No. 1819619.6 filed on Nov. 30, 2018, the disclosures of both of which are hereby incorporated by reference herein in their entirety for all purposes.

TECHNICAL FIELD

The present application relates to a method and an apparatus for determining a position of a vehicle within a transport network. More specifically but not exclusively, the present application relates to a method and an apparatus for determining a route a vehicle takes through a junction of the transport network, by using a Bayesian estimation filter algorithm without relying upon track-side infrastructure.

BACKGROUND

At a network junction of a transport network, multiple tracks intersect with one another. Therefore, the network junction presents multiple route options for the vehicle to take. It is important to know the particular route taken by the vehicle through the network junction, in order to allow for seamless operation of the vehicle through the network junction. This information is currently provided via track-side infrastructure.

Track-side infrastructure includes, for example, balises or beacons, which are installed at fixed locations along the tracks. The track-side infrastructure is able to detect the passing of a vehicle and is generally available along each route option provided by the network junction. The track-side infrastructure may transmit signal indicating that the vehicle has passed a particular location to either the network signalling system or the vehicle. Accordingly, by using the track-side infrastructure, the network signalling system or the vehicle itself is able to determine the particular route option taken by the vehicle through the network junction. The track-side infrastructure is expensive to install and maintain. In addition, the use of track-side infrastructure is dependent on the communication link with the vehicle or the network signalling system. Therefore, the route detection method using the track-side infrastructure is not autonomous.

While it is common for a vehicle to carry a Global Navigation Satellite System (GNSS) sensor, the GNSS sensor suffers from a lack of signal availability and continuity in many common operational environments, e.g., tunnels. Therefore, it is generally not sufficient to rely upon the GNSS sensor alone to position a vehicle.

Thus, there is a need to provide a system and a method for reliably determining a route a vehicle takes through a junction of a transport network without utilising the track-side infrastructure.

SUMMARY

According to a first aspect described herein, there is provided a computer-implemented method of determining a position of a vehicle within a transport network, comprising: obtaining track geometry data indicating track geometry of at least a part of the transport network; determining, based upon the track geometry data, that the vehicle is approaching a junction; determining, based upon the track geometry data, a plurality of route options from the junction; generating a plurality of Bayesian estimation filter algorithms each associated with a respective one of the plurality of route options and configured to estimate a position of the vehicle based upon the track geometry data indicative of the associated route option, wherein the plurality of Bayesian estimation filter algorithms are configured to output data indicative of probabilities of the vehicle taking the associated route options; monitoring the output of the plurality of Bayesian estimation filter algorithms as the vehicle passes through the junction; and determining the route option taken by the vehicle by selecting one of the plurality of route options which presents the highest probability based upon the output of the plurality of Bayesian estimation filter algorithms.

The transport network may be a guided transport network (e.g., railway, tramway). The guided transport network has tracks to which movement of the vehicle (e.g., a train, a tram) is strictly confined in normal operations.

The transport network may also be a road or motorway network having tracks (e.g., roads or routes) for a vehicle (e.g., car, lorry) to follow, or a waterway network having tracks (e.g. a canal) constraining a route taken by a vehicle (e.g., a boat).

In general, the transport network imposes track constraints to the position and the movement of the vehicle. For example, the vehicle is expected to move along the curvature of the tracks/routes provided by the transport network, unless something goes seriously wrong. The track geometry data, as its name suggests, is data indicative of the track geometry of the transport network, and thus defines the track constraints imposed by the transport network to the vehicle.

The Bayesian estimation filter algorithm is commonly used to estimate a state of a system based upon sensor measurements which indirectly measure the state. The Bayesian estimation filter algorithm may be used interchangeably with "sensor fusion algorithm" or "optimal estimation algorithm".

Advantageously, a plurality of Bayesian estimation filter algorithms each associated with a respective one of the plurality of route options presented by the junction are used to resolve the particular route option taken by the vehicle. As such, there is a reduced or removed need for the provision of track-side infrastructure to disambiguate the route option taken by the vehicle through a junction, and the route can be determined when track-side infrastructure is unavailable in the locality of a network junction. This permits for seamless travel of the vehicle through the junction, and allows for a significant cost saving to the network operator in terms of procurement, installation and maintenance of track-side infrastructure.

The data indicative of probabilities of the vehicle taking the associated route options may comprise innovation values calculated by the plurality of Bayesian estimation filter algorithms.

Innovation is a parameter calculated in the update step of a Bayesian estimation filter algorithm. In general, the value of the innovation represents a difference between a measurement fed to the Bayesian estimation filter algorithm and a predicted measurement.

The plurality of Bayesian estimation filter algorithms may be configured to calculate the innovation values based upon pseudo-measurements of the associated route options. The pseudo-measurements of the associated route options may be determined based upon the track geometry data indicative of the associated route options.

The pseudo-measurements may comprise a pseudo-measurement of an attitude of the vehicle along a track defined by the track geometry data indicative of one of the route options.

The pseudo-measurement of the attitude of the vehicle may be calculated based upon a tangent of the track defined by the track geometry data at the estimated position of the vehicle.

The plurality of Bayesian estimation filter algorithms may be configured to calculate the innovation values based upon the pseudo-measurements of the associated route options and the respective estimated positions of the vehicle.

It will be understood that the innovation value is a difference between the pseudo-measurement and a product of an estimated state of the vehicle and a measurement model. The estimated state of the vehicle is generated by the Bayesian estimation filter algorithm and includes the estimated position of the vehicle. The measurement model is arranged to map a state space in which the estimated state lies to a measurement space in which the pseudo-measurement lies.

Selecting one of the plurality of route options which presents the highest probability may comprise selecting one of the plurality of route options which achieves the lowest innovation value.

Selecting one of the plurality of route options which presents the highest probability may comprise: comparing the innovation values calculated by the plurality of Bayesian estimation filter algorithms against a predetermined threshold value, and selecting one of the plurality of route options which presents an innovation value below the predetermined threshold value.

The plurality of Bayesian estimation filter algorithms may be configured such that the estimated positions of the vehicle lie along the associated route options indicated by the track geometry data.

That is, the plurality of Bayesian estimation filter algorithms may be constrained by the track geometry data, and the estimated positions of the vehicle may be constrained to be on the tracks of the transport network as defined by the track geometry data. This may be achieved in various ways. In an example, the final estimated position (unconstrained) output by the algorithm may be orthogonally projected onto the tracks defined by the track geometry data so as to obtain a constrained solution. In an alternative example, the track geometry data imposes implicit one-dimensional motion constraints on the time evolution of the estimated state of the algorithms.

The plurality of Bayesian estimation filter algorithms may be executed in parallel to one another.

The vehicle may carry at least one sensor, the at least one sensor being arranged to output a signal indicative of a motion of the vehicle. The plurality of Bayesian estimation filter algorithms may be configured to estimate a position of the vehicle based upon the output signal of the at least one sensor.

The at least one sensor may comprise an inertial measurement unit, IMU, and a sensor other than an IMU.

The sensor other than an IMU may be selected from a group consisting of at least one of a GNSS sensor, a balise reader, a radar, a speed sensor, an odometer, a video camera and a lidar detector. The IMU may be a low-cost MEMS IMU.

Determining that the vehicle is approaching a junction of the transport network may comprise executing a first Bayesian estimation filter algorithm to estimate a position of the vehicle based upon the track geometry data; and determining that the estimated position of the vehicle is approaching a junction of the transport network.

The first Bayesian estimation filter algorithm may be executed to:
predict a position of the vehicle in a prediction step based at least upon a first sensor data output by the IMU and the track geometry data such that the predicted position of the vehicle lies on a track defined by the track geometry data; and
update the predicted position of the vehicle in an update step based at least upon a second sensor data output by the sensor other than an IMU, and
wherein the estimated position of the vehicle is based upon at least one of the predicted position and the updated predicted position of the vehicle.

The first Bayesian estimation filter algorithm may comprise a strapdown inertial navigation algorithm. The method may further comprise executing the strapdown inertial navigation algorithm in the prediction step based upon the track geometry data and the first sensor data. The strapdown inertial navigation algorithm may be configured to calculate a speed of the IMU along a track defined by the track geometry data based at least upon the first sensor data, to integrate the speed over time and to generate the predicted position of the IMU based at least upon the track geometry data and the integration of the speed.

Constraining the strapdown inertial navigation algorithm by the track geometry data in this way reduces the problem of estimating an unconstrained three-dimensional position of the vehicle to the problem of estimating a one-dimensional position of the vehicle along the track of the transport network, because the vehicle has only one degree of freedom along the track.

Advantageously, by having the strapdown inertial navigation algorithm constrained by the track geometry data, the predicted position of the vehicle is constrained to be on the track of the transport network as defined by the track geometry data. Further, the strapdown inertial navigation algorithm models the propagation of kinematic state estimation errors into the one-dimensional position solution space and allows the instantaneous curvature and tangent information of the track as defined in the track geometry data to be taken into account.

Generating a plurality of Bayesian estimation filter algorithms may comprise generating a plurality of copies of the first Bayesian estimation filter algorithm.

The computer-implemented method may further comprise executing at least one copy of the first Bayesian estimation filter algorithm in an update step to update the predicted position of the vehicle based at least upon the second sensor data and the pseudo-measurement of the associated route option.

That is, the pseudo-measurement derived from the track geometry data may be used together with the second sensor data for updating the predicted position of the vehicle.

The computer-implemented method may further comprise deleting copies of the first Bayesian estimation filter algorithm which are associated with the unselected route options.

In this way, only the copy associated with the selected route option remains after the vehicle passes the junction. The remaining copy of the Bayesian estimation filter algorithm serves (as the first Bayesian estimation filter algorithm) to continue estimating the position of the vehicle for determining whether the vehicle is approaching a next junction.

The plurality of Bayesian estimation filter algorithms may comprise an unscented Kalman filter.

Among all of the Bayesian estimation filter algorithms which handle non-linear process models, the unscented Kalman filter is advantageous in that it is better at handling non-linearities and it does not require the evaluation of explicit, or numerically approximated, Jacobians for the process models.

The plurality of Bayesian estimation filter algorithms may comprise a Lie-group unscented Kalman filter. That is, the Bayesian estimation filter algorithm may operate in a state space and/or a measurement space which is represented by Lie groups (in particular, matrix Lie groups). It is advantageous to represent the state and the measurement spaces using Lie groups, because Lie groups can easily represent a complex state which comprises multiple sub-states using a product matrix Lie group without losing the typological structure of the state space.

Obtaining the track geometry data may comprise: accessing a map database, wherein the map database comprises sample points positioned along tracks within the transport network; retrieving from the map database sample points in the vicinity of the vehicle; and applying an interpolation function through the retrieved sample points to obtain a track constraint function, wherein the track geometry data comprises the track constraint function.

Advantageously, by applying an interpolation function through the retrieved sample points from the map database, the track constraint function (which is included within the track geometry data) comprises lines/curves which represent centrelines of the tracks within the transport network. Thus, the track constraint function is able to represent the potential route(s) of the vehicle, the potential direction of the vehicle, and kinematic constraints to be imposed within the Bayesian estimation filter algorithm to improve the estimation of errors in the kinematic state (e.g., the position) of the vehicle when no source of absolute position information is available. It would be appreciated that the density of the sample points (which may be used interchangeably with "support points") affects the accuracy of the track constraint function.

The track constraint function may comprise a twice differentiable curve with a continuous second-order derivative at least one of the retrieved sample points.

Advantageously, the twice differentiable curve with a continuous second-order derivative allows the curvature and tangent information of the tracks (in particular, the track centrelines) within the transport network to be modelled more accurately than would be possible with a conventional piecewise linear interpolation using the same number of sample points. Accordingly, the track constraint function provides a powerful constraint on the to-be-estimated kinematic state of the vehicle without discontinuities, and improves the estimation of errors in the output of the Bayesian estimation filter algorithm.

The interpolation function may comprise a cubic spline function.

Advantageously, the cubic spline interpolation implicitly provides a twice differentiable curve with a continuous second-order derivative. Furthermore, amongst all of the twice differentiable functions, the cubic spline interpolation function yields the smallest norm of strain energy and allows the track constraint function obtained thereby to have a curve progression with minimal oscillations between the sample points.

The vehicle may comprise one of a train or a tram.

According to a second aspect described herein, there is provided a computer program comprising computer readable instructions configured to cause a computer to carry out a method according to the first aspect described herein.

According to a third aspect described herein, there is provided a computer readable medium carrying a computer program according to the second aspect described herein.

According to a fourth aspect described herein, there is provided an apparatus for determining a position of a vehicle within a transport network, comprising: a memory storing processor readable instructions; and a processor arranged to read and execute the processor readable instructions stored in the memory, wherein the processor readable instructions comprise instructions arranged to control the processor to carry out a method according to the first aspect described herein.

The apparatus may be attached to the vehicle.

Where appropriate any of the optional features described above in relation to one of the aspects described herein may be applied to another one of the aspects described herein.

BRIEF DESCRIPTION OF THE DRAWINGS

Embodiments are now described, by way of example only, with reference to the accompanying drawings, in which.

In the figures, like parts are denoted by like reference numerals.

It will be appreciated that the drawings are for illustration purposes only and are not drawn to scale.

DETAILED DESCRIPTION OF THE PREFERRED EMBODIMENTS

Figure 1:
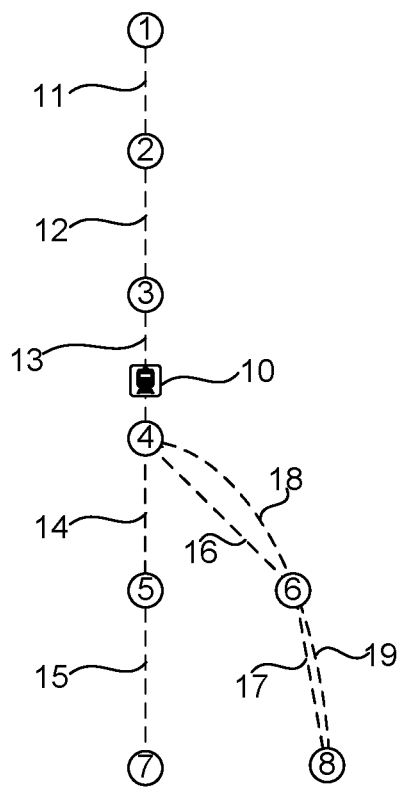
FIG. 1 schematically illustrates a part of a model of a transport network.

A model of a transport network is schematically shown in FIG. 1. The transport network may be a guided transport network (e.g., railway, tramway) which has tracks to which movement of the vehicle (e.g., a train, a tram) is strictly confined in normal operations. Alternatively, the transport network may be a road or motorway network, which has tracks (e.g., roads or routes) for a vehicle (e.g., a car, a lorry) to follow. Alternatively, the transport network may be a waterway having tracks (e.g. a canal) constraining a route taken by a vehicle (e.g., a boat). In the following exemplary embodiments, it is generally assumed that the transport network is a railway, though it is to be understood that the techniques described herein are not limited to such.

The transport network is represented by vertices 1-8 and edges 11-17. The vertices 1-8 are located along the tracks of the transport network. In an example, the positions of the vertices are known a priori. The vertices may be independent of the locations of fixed track-side infrastructure (e.g., balises) installed along the rail tracks. The vertices may also be referred to as support points in the following description. The edges 11-17 correspond to the tracks between the vertices 1-8. A sequence of the vertices connected via the edges 11-17 forms a path for a vehicle. The accuracy of a path is determined by the density of the vertices.

Figure 2:
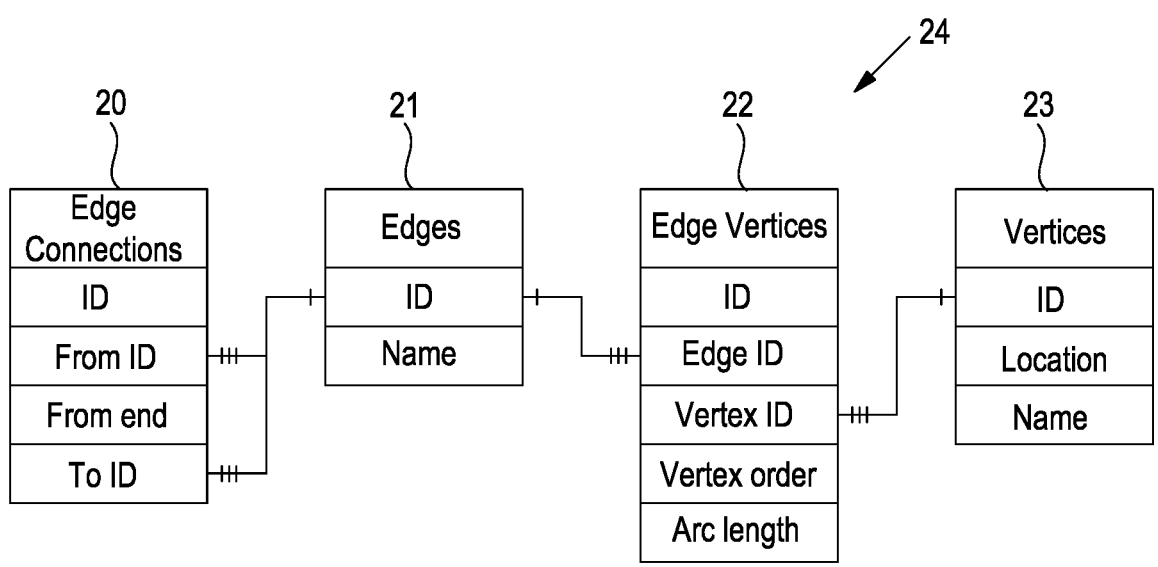
FIG. 2 schematically illustrates a map database storing the model of the transport network of FIG. 1.

In the presently described example, the model shown in FIG. 1 is stored digitally in a map database 24. The map database 24 may also be referred to as a support point database. FIG. 2 provides an example of the configuration of the map database 24.

In the example of FIG. 2, the map database 24 includes four types of data entities, i.e., Edge Connections 20, Edges 21, Edge Vertices 22 and Vertices 23. The connections in FIG. 2 are all one-to-many, with the single dash end representing the one end. Each of the data entities 20-23 has an "ID" attribute. The Edge Connections entity 20 further comprises a "From ID" attribute, a "From end" attribute and a "To ID" attribute. The Edges 21 entity further comprises a "Name" attribute. The Edge Vertices entity further comprises an "Edge ID" attribute, a "Vertex ID" attribute, a "Vertex order" attribute and an "Arc length" attribute. The Vertices entity 23 further comprises a "Location" attribute (storing location data such as, the Earth-Centred Earth-Fixed (ECEF) location of the respective vertex) and a "Name" attribute. The vertices 1-8 of FIG. 1 are represented by instances of the Vertices entity 23. An instance of the Edges entity 21 may include all of the vertices between junctions. For example, three instances of the Edges entity 21 may be provided for the transport network shown in FIG. 1, with the first instance including the vertices 1, 2, 3, 4, the second instance including the vertices 4, 5, 7 and with the third instance including the vertices 4, 6, 8. Generally, it will be understood that references below to Edge Connections 20, Edges 21, Edge Vertices 22 and Vertices 23 refer to instances of the corresponding entities.

Edge Vertices 22 associate the Edges 21 with the Vertices 23 which are located on or at the ends of each respective one of the Edges 21. In an example, the "Arc length" attribute of the Edge Vertices entity 22 indicates the arc length from the start (or the end) of an instance of the Edges 21 to a vertex included within that instance. In an alternative example, the parameter indicates the arc length from the start of an entire path (of which the instance of the Edges 21 is a part) to the vertex. The Arc length attribute provides the arc length of the tracks through the Vertices 23.

The Edge Connections 20 define the connections between the Edges 21. For example, an instance of Edge Connections entity 20 may define a "connected to" relationship between the first instance of the Edges entity 21 which includes the vertices 1, 2, 3, 4, and the second instance of the Edges entity 21 which includes the vertices 4, 5, 7 and the third instance of the Edges entity 21 which includes the vertices 4, 6, 8.

The map database 24 may be stored locally on a vehicle 10 (a representation of which is shown in the model of FIG. 1) which travels within the transport network, such that the vehicle can access the map database without requiring wireless communication channels. Alternatively, the map database 24 may be stored at a server (not shown) remote from the vehicle 10. It will be appreciated that the map database 24 may take any suitable configuration, and is not limited to the example provided by FIG. 2. In an example, the map database 24 is implemented using an SQL compliant database. It will be appreciated, however, that the map database 24 may be implemented in any way and need not be relational. For example, the database 24 may comprise flat files.

Figure 3:
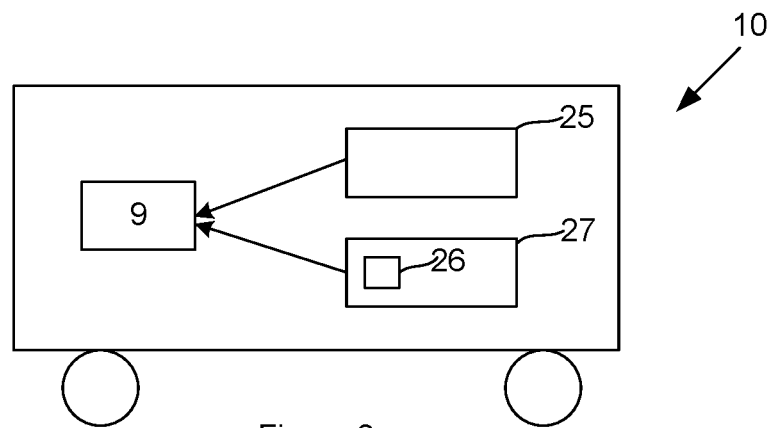
FIG. 3 schematically illustrates a vehicle which travels within the transport network of FIG. 1.

FIG. 3 schematically illustrates the vehicle 10. The vehicle 10 carries a controller 9 and a sensor group. The sensor group includes sensors for monitoring the motion of the vehicle 10. The sensor group includes at least one sensor 27 which provides information indicating reference positions of the vehicle and at least one sensor 25 which provides information indicating absolute positions of the vehicle.

Examples of the sensor 25 include a GNSS sensor, a balise reader, a video camera and a lidar detector. The sensor 25 relies upon data transmission between the vehicle 10 and external sources (e.g., satellite, or balises installed along the tracks of the transport network or a database containing information for scene matching) to provide absolution positional information for the vehicle 10.

The sensor 27 includes an inertial measurement unit (IMU) 26, and may include other sensors (e.g., a radar, a speed sensor, or an odometer). The IMU 26 may have a six degree-of-freedom (DOF) configuration and have one gyroscope and one accelerometer for each of three orthogonal axes. The accelerometer is for detecting the specific force, and the gyroscope is for detecting the angular rate. It would be appreciated that the IMU 26 may take a simpler configuration. The odometer may include a wheel-odometer, a visual-odometer, or a radar-odometer. In general, the odometer estimates the speed of the vehicle 10. The IMU 26 may be a low-cost Micro-Electro-Mechanical Systems (MEMS) IMU.

The sensor 27 allows for dead reckoning navigation and does not rely upon signal transmission between the vehicle 10 and external sources. However, the sensor 27 provides information that can be used to compute a relative position of the vehicle 10 given a set of initial conditions. Further, the sensor 27 is subject to cumulative error and may undergo regular calibration procedures in order to maintain quality.

Figure 4:
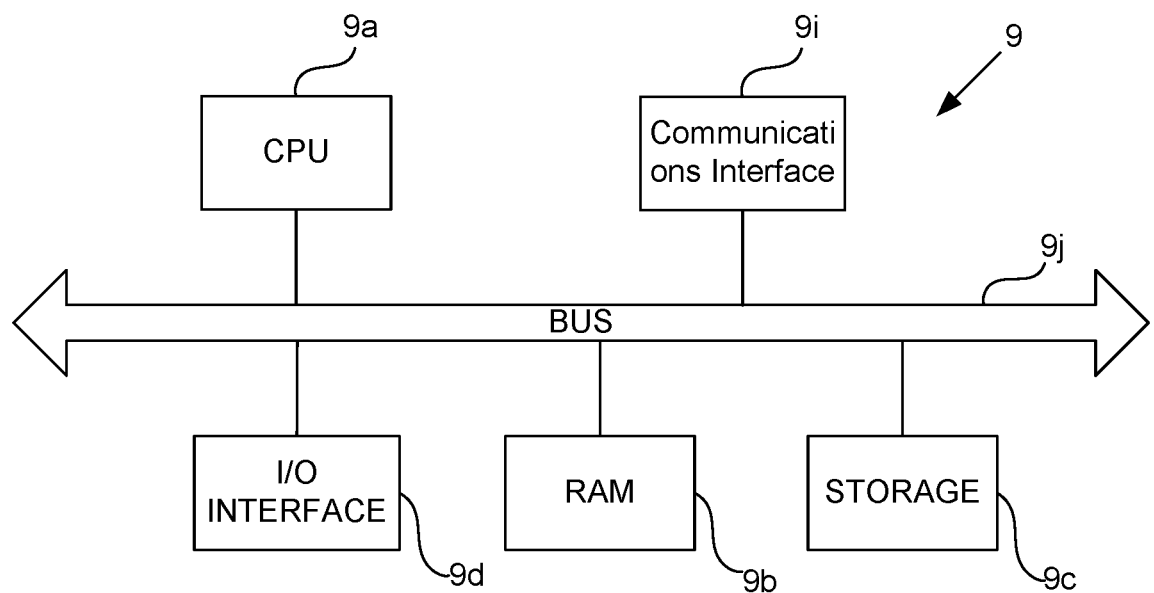
FIG. 4 schematically illustrates the structure of a controller carried by the vehicle of FIG. 3.

FIG. 4 schematically illustrates an exemplary structure of the controller 9. The controller 9 comprises a CPU 9a which is configured to read and execute instructions stored in a RAM memory 9b which may be a volatile memory. The RAM 9b stores instructions for execution by the CPU 9a and data used by those instructions. The controller 9 further comprises non-volatile storage 9c, such as, for example, a hard disk drive, although it will be appreciated that any other form of non-volatile storage may be used. Computer readable instructions for execution by the CPU 9a may be stored in the non-volatile storage 9c. Further, the non-volatile storage 9c may store a copy of the map database 24.

The controller 9 further comprises an I/O interface 9d to which peripheral devices used in connection with the controller 9 may be connected. The peripheral devices may include keyboard, data storage devices, etc. A communications interface 9i may also be provided. The communications interface 9*i* may provide for short range connections to other devices (e.g. the sensors 25, 27). The short range connections may be via Bluetooth, near-field communication (NFC), etc. The communications interface 9*i* may also provide for connection to networks such as the Internet or satellites, for longer range communication. The longer range communication may be used to retrieve the map database 24 if the map database 24 is stored in a server remote from the vehicle 10. The longer range communication may also be used by a GNSS sensor to generate absolute positional information. The CPU 9*a*, RAM 9*b*, non-volatile storage 9*c*, I/O interface 9*d* and communications interface 9*i* are connected together by a bus 9*j*.

It will be appreciated that the arrangement of components illustrated in FIG. 4 is merely exemplary, and that the controller 9 may comprise different, additional or fewer components than those illustrated in FIG. 4.

Figure 5:
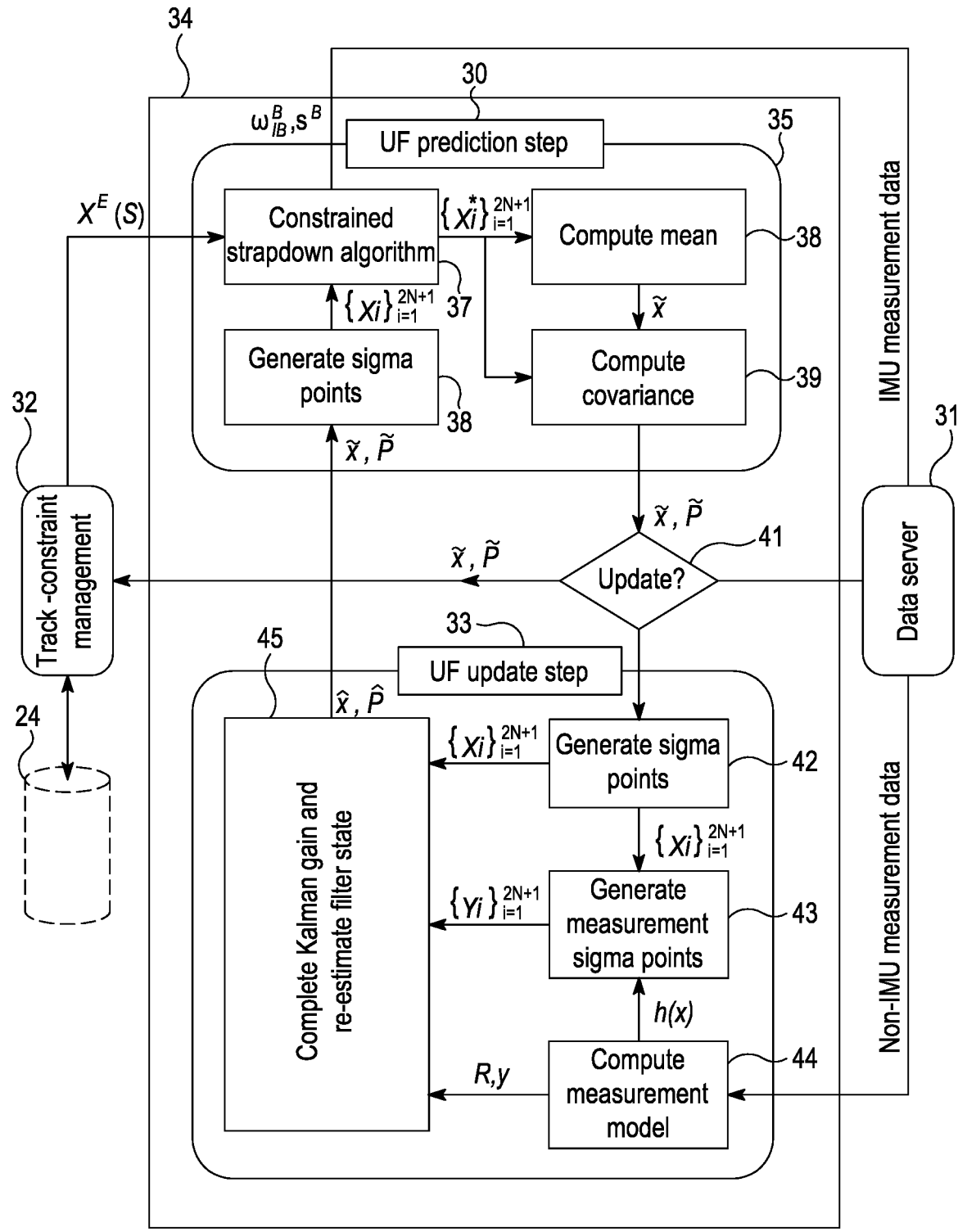
FIG. 5 schematically illustrates an example of a Bayesian estimation filter executed by the controller of FIG. 4 for estimating a position of the vehicle.
Figure 6:
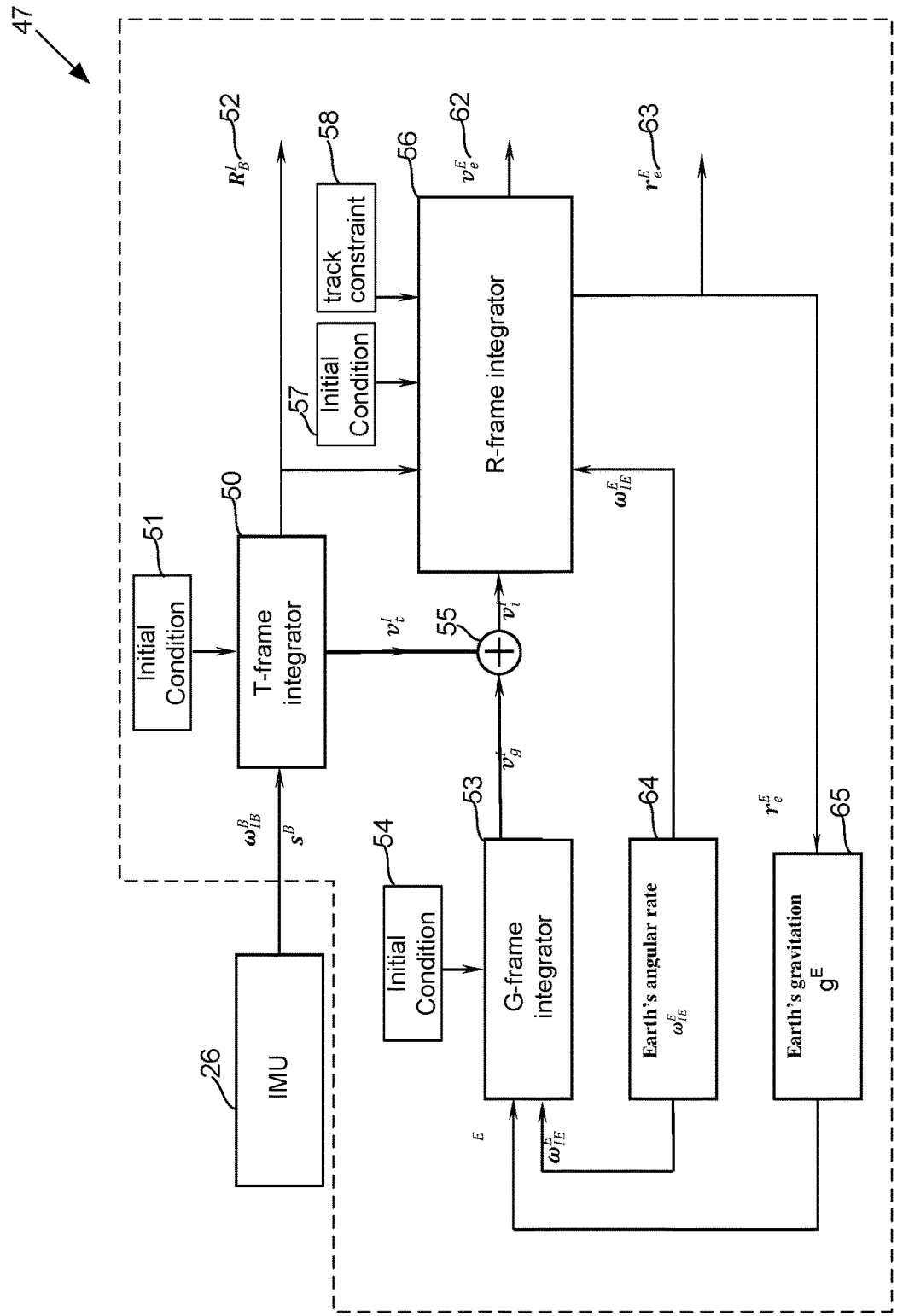
FIG. 6 schematically illustrates functional components of a constrained strapdown inertial navigation system used in the Bayesian estimation filter of FIG. 5.
Figure 7:
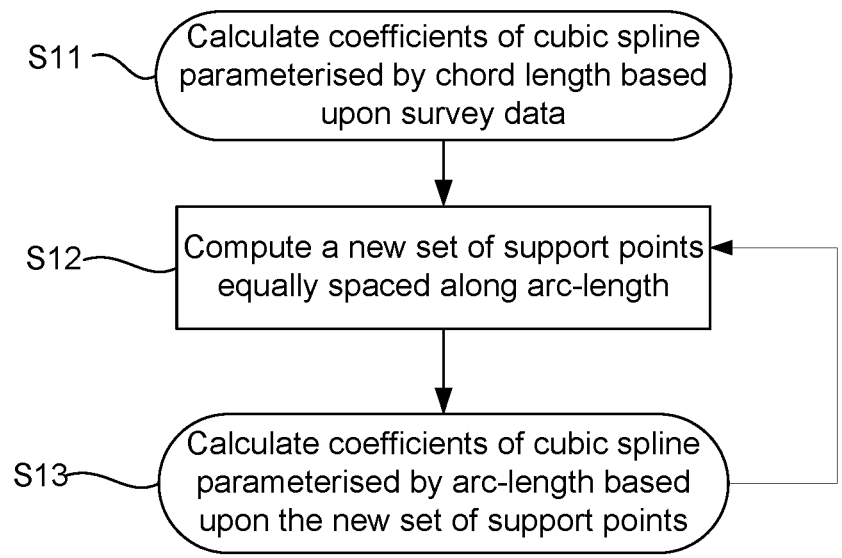
FIG. 7 is a flowchart of example processing steps that may be carried out by a server in order to facilitate the calculation of a cubic spline parameterised by arc-length.

The computer readable instructions stored in the non-volatile storage 9*c* provide functional components as shown in FIGS. 5 to 6. The computer readable instructions when executed by the CPU 9*a*, causes the controller 9 to carry out the processing steps shown in FIGS. 7 and 12 to determine a route taken by the vehicle 10 through a junction.

In particular, as illustrated in FIG. 5, the computer readable instructions provide a data server 31, a track-constraint manager 32, and a navigation filter 34 which may also be referred to as a Bayesian estimation filter. In the particular example of FIG. 5, the navigation filter 34 is implemented as an unscented Kalman filter. The navigation filter 24 includes a state predictor 35 and a state updater 40.

Data Server 31

The data server 31 is responsible for collecting and distributing the sensor data received from the sensors 25, 27 to the navigation filter 34. Two data streams are output by the data server 31, i.e., (i) the inertial measurements collected from the IMU 26 and used as a control input to drive the state predictor 35, and; (ii) all non-IMU sensor measurements used to drive the state updater 40.

Track-Constraint Manager 32

The track-constraint manager 32 manages the interface between the navigation filter 34 and the map database 24 and provides an up-to-date track constraint function $x^E(s)$ to a constrained strapdown inertial navigation system (INS) 47 (shown in FIG. 6) of the state predictor 35.

The track constraint function $x^E(s)$ comprises three-dimensional curves that provide an approximation of the centrelines of the tracks within a part of the transport network which is in the vicinity of the vehicle 10. The track constraint function $x^E(s)$ may be considered as an example of the "track geometry data" since it indicates the geometry of the tracks of the transport network. Given that the vehicle 10 is expected to follow the tracks, the track constraint function $x^E(s)$ thus represents the constraint applied by the tracks of the transport network to the kinematic state of the vehicle. The parameter s is the arc-length of the centreline of the track from a chosen reference point. The superscript $^E$ is used to indicate that the track constraint function is defined with respect to the E-frame, which is a rotating frame of reference, fixed in the body of the Earth, and represented by a right-handed Cartesian set of axes with origin located at the centre of the Earth (i.e., the ECEF coordinate system).

The track constraint function $x^E(s)$ is constructed on-the-fly by the track constraint manager 32 from a set of support points (i.e., instances of the Vertices entity 23) stored in the map database 24. The track constraint manager 32 uses a latest estimated state $\tilde{x}$ output by the state predictor 35 (which includes the estimated position of the vehicle 10 as described below) to query the database 24, and identifies all support points in a local neighbourhood around the estimated position of the vehicle 10 and all possible trajectories that the vehicle 10 could then follow. The identified support points characterise the local track geometry and topology so that track constraints can be constructed for all possible routes passing through the estimated position of the vehicle 10. The track constraint manager 32 may construct multiple track constraint functions if there are multiple routes within the neighbourhood of the estimated position of the vehicle 10.

In an example as shown in FIG. 1, when the track constraint manager 32 determines that the vehicle 10 is between the vertices 3 and 4, the track constraint manager 32 identifies all support points within a range of three vertices at either side of the current estimate of the position of the vehicle 10 from the map database 24. The identified support points are vertices 1 to 8 shown in FIG. 1. In practice, the track constraint manager 32 may identify, for example, twenty support points on either side of the vehicle 10 in the vicinity of the current estimate of the position of the vehicle 10. It has been found that twenty support points will generally provide sufficient information to understand the track geometry in the neighbourhood of the vehicle 10. The support points are identified dynamically according to the current estimate of the position of the vehicle 10.

The possible trajectories that the vehicle 10 could follow can be easily determined based upon the Edge Vertices 22 and the Edge Connections 20 associated with the identified support points. For example, when the track constraint manager 32 determines that the vehicle 10 is between the vertices 3 and 4 and travelling towards the vertex 4, the track constraint manager 32 can determine that there are two possible paths (i.e., via edge 14 or edge 16) for the vehicle 10 to take after it passes the vertex 4. Each trajectory is defined by a subset of the identified support points, accounting for any implicit constraints in the transport network. The movement direction of the vehicle 10 may be directly measured by the sensors 25, 27, or alternatively may be indicated in the latest estimated state $\tilde{x}$ output by the state predictor 35.

The track constraint manager 32 constructs the track constraint function $x^E(s)$ as a polynomial function using the identified support points and the possible trajectories. The track constraint function $x^E(s)$ is constructed by interpolating the identified support points. In an example, the track constraint function $x^E(s)$ has continuous second-order derivatives through each of the identified support points.

The use of polynomial function with continuous second-order derivatives to interpolate the identified support points is advantageous in that it allows the centrelines of the tracks to be modelled more accurately than would be possible with a conventional piecewise linear interpolation using the same number of support points. Railway tracks, for example, (and most of the motorways) are constructed to enable safe and comfortable motion with low lateral jerk. Therefore, the variation in track curvature is smooth. As a consequence, a twice differentiable curve with a continuous second-order derivative is a suitable mathematical model for the track. Indeed, unlike the more conventional piecewise linear interpolation schemes, such a model provides a powerful constraint on the to-be-estimated kinematic state (e.g., position, direction of motion and the rate-of-change of direction of motion) of the vehicle without discontinuities.

In a particular example, the track constraint function $x^E(s)$ is a cubic spline, and the parameter s is the arc-length along the spline from a chosen reference point. A cubic spline is a spline interpolation constructed of piecewise third-order polynomials which pass through a set of control points (e.g., the identified support points). By construction, the cubic spline implicitly provides a twice differentiable curve with a continuous second-order derivative. Furthermore, the cubic spline yields the smallest norm of strain energy amongst all of the twice differentiable functions with a continuous second-order derivative that interpolate a set of supporting points and satisfy the same end-point conditions. The result obtained by the cubic spline interpolation is a curve progression with minimal oscillations between the supporting points.

The track constraint manager 32 may calculate the coefficients of a cubic spline parameterised by arc length, based upon the positions of the identified support points, the boundary conditions (either natural or fixed) of the cubic spline and the continuity requirements of first-order and second-order derivatives. To facilitate the calculation of the cubic spline by the track constraint manager 32, the support points stored in the map database 24 may be processed, for example, by a server (not shown), during the construction of the map database 24 based upon survey data in accordance with the processing steps shown in FIG. 7 and described below. In an example, the survey data includes discrete points sampled along the tracks of the transport network and includes information indicating the positions of the discrete points. The server which performs the steps of FIG. 7 may be remote from the vehicle 10 and be responsible for constructing the map database 24 based upon the survey data.

At step S11, the server calculates the coefficients of a conventional cubic spline parameterised by chord length based upon the survey data. In particular, the calculation is based upon the positions of at least some of the discrete points included within the survey data, the boundary conditions (either natural or fixed) of the cubic spline and the continuity requirements of first-order and second-order derivatives. At step S12, the server computes a new set of support points which are equally spaced along the arc-length of the cubic spline calculated at step S11. At step S13, the server calculates the coefficients of a cubic spline parameterised by arc-length, using the new set of support points calculated at step S12, the boundary conditions and the continuity requirements of first-order and second-order derivatives. The server may iterate through steps S12 and S13 in order to yield better results (e.g., to ensure that the new set of support points calculated at step S12 are substantially equally spaced along the re-parameterised cubic spline calculated at step S13). The new set of support points calculated at step S12 may be stored in the map database 24 as support points.

In general, the track constraint function $x^E(s)$ represents an a priori knowledge of the track geometry of the transport network, and is useful for improving the navigation accuracy of the navigation filter 34. In particular, the track constraint function $x^E(s)$ improves the observability of errors in both the vehicle's navigation solution and the errors in the sensor measurements (e.g., the biases in the inertial measurements of the IMU 26) output by the sensors 25, 27 which are used to calculate the navigation solution. Further, when used in the navigation filter 34 as described below, the track constraint function $x^E(s)$ reduces the problem of estimating an unconstrained three-dimensional motion of the vehicle 10 to the problem of estimating a one-dimensional constrained motion of the vehicle 10 along the track of the transport network, because the vehicle 10 has only one degree of freedom along the track.

By constructing the track constraint function $x^E(s)$ on-the-fly from a small subset of support points in the vicinity of the current estimate of the position of the vehicle 10, the track constraint function $x^E(s)$ focuses upon the local constraints imposed on the vehicle by a small part of the transport network (instead of the entire transport network) in the neighbourhood of the vehicle, and the track constraint function $x^E(s)$ can be computed with great flexibility and efficiency. The local constraints provide sufficient information for estimating the kinematic state of the vehicle 10. Indeed, it has been realised that the geometry of the tracks far away from the vehicle 10 is less useful (if at all) for determining the kinematic state of the vehicle 10.

For ease of description, the dashed lines 18 and 19 shown in FIG. 1 represent the curved track centrelines defined by the track constraint function $x^E(s)$ which is constructed by cubic spline interpolation through the vertices 4, 6 and 8. It is assumed that the tracks between the vertices 1 to 5 and 5 and 7 are straight, and therefore the edges 11 to 15 represents the track centrelines defined by the track constraint function $x^E(s)$.

Overview of the Navigation Filter 34

The navigation filter 34 utilises a Bayesian filter algorithm and includes prediction and update steps for estimating the state $\tilde{x}$ of the vehicle 10. The estimated state $\tilde{x}$ includes the kinematic state of the vehicle 10 (e.g., the position, velocity and/or attitude of the vehicle 10). The estimated state $\tilde{x}$ further includes states (e.g., the biases in the inertial measurements of the IMU 26) which are required to represent the kinematic state of the vehicle 10 and which may be determined in order to minimise the accumulation of errors in the estimation process.

In the prediction step 30, the state predictor 35 of the navigation filter 34 calculates the mean of the estimated state $\tilde{x}$ (also called an a priori estimate) at step 38 and its associated error covariance P at step 39, based upon the track constraint function $x^E(s)$, the IMU measurement data $\omega_{IB}^B$ and $s^B$, and the estimate state 2 and its associated error covariance $\hat{P}$ generated during the previous update step 33 by the state updater 40 (or the estimated state $\tilde{x}$ and its associated error covariance $\tilde{P}$ generated during the previous prediction step 30 if there is no available non-IMU measurement as described below).

The IMU measurement data may be referred to as "first sensor data". The non-IMU measurement data may be referred to as "second sensor data".

The prediction step 30 is data driven by the inertial measurements collected from the IMU 26. The prediction step 30 is used to propagate the estimated state forward in time between updates of the non-IMU sensor measurement.

When a prediction step 30 completes, the data server 31 is queried at step 41 to determine if there is any pending non-IMU sensor measurement. If there is no available non-IMU measurement, then the prediction step 30 is repeated with each incoming IMU measurement data until a time when non-IMU measurement data becomes available. Further, when a prediction step 30 completes, the newly estimated state $\bar{x}$ and its associated error covariance P are passed to the track constraint manager 32 in order to provide up-to-date track constraint function $x^E(s)$.

When a non-IMU sensor measurement y is available from the data server 31, the update step 33 is triggered. In the update step 33, the state updater 40 of the navigation filter 34 calculates the mean of the estimated state 2 (also called an a posteriori estimate) and its associated error covariance $\hat{P}$ at step 45, based upon the a priori estimate $\tilde{x}$ and its associated error covariance $\tilde{P}$ and the non-IMU sensor measurement y. The estimated state $\hat{x}$ and its associated error covariance $\hat{P}$ are subsequently supplied to the prediction step 30 of the next epoch.

After the completion of a prediction or an update step, the mean of the estimated state $\tilde{x}$ or $\hat{x}$ is available for the controller 9 to generate an output indicative of a position of the vehicle 10 within the transport network.

In this way, the navigation filter 34 is able to provide a relatively accurate estimate of the state of the vehicle 10 by fusing the IMU sensor measurement and the non-IMU sensor measurement with the track constraint function $x^E(s)$. Due to the nature of the Bayesian estimation filter (which filters noise instead of data), the noise contained in the estimated state of the vehicle 10 is of a lesser extent than either the process noise contained in the state process model (e.g., constrained strapdown INS 47) or the measurement noises contained in the IMU sensor measurement and the non-IMU sensor measurement.

In the particular example provided by FIG. 5, the navigation filter 34 is implemented as an unscented Kalman filter. The unscented Kalman filter is suitable for handling non-linear process models and does not require the evaluation of explicit, or numerically approximated, Jacobians for the process models (which are however required by the extended Kalman filter).

In the unscented Kalman filter, an unscented transform is used to estimate the mean and error covariance of the state as it evolves in time according to a non-linear process model. The fundamental assumption is that the distribution of the estimated state can be approximated well by a Gaussian distribution at all times, in particular, after the state $\hat{x}$ is propagated through the state process model (represented by the constrained strapdown INS 47 in the example of FIG. 5), and after the state $\tilde{x}$ is adjusted to incorporate the non-IMU sensor measurement y output by the data server 31.

The unscented transform is performed utilising a carefully constructed set of sample points (referred to as "sigma points") from the mean of the estimated state (e.g., $\tilde{x}$, $\hat{x}$) and its associated error covariance (e.g., $\tilde{P}$, $\hat{P}$). The number of the sigma points is 2N+1, with N being the dimension of the state. The 2N+1 sigma points includes one point equal to the mean of the estimated state, and 2N points arranged symmetrically about the mean. The calculation of the sigma points for an unscented Kalman filter is described in references [1]-[2] and is well known in the field of art. The sigma points are transformed through the relevant system models and the resulting transformed points are used to recover estimates of the mean and the error covariance of the transformed state.

The prediction step 30 and the update step 33 of the navigation filter 34 are described in more detail below with reference to the state predictor 35 and the state updater 40.

State Predictor 35

The state predictor 35 generates at step 36 a set of sigma points which are denoted by $\{\chi_i\}_{i=1}^{2N+1}$, based upon the current mean of the estimated state 2 and its associated error covariance P generated during the update step 33 of the previous epoch.

The state predictor 35 further includes a constrained strapdown INS 47 (shown in FIG. 6) which serves as a state process model and performs step 37 to propagate the estimated state forward in time. The IMU measurement data $\omega_{IB}^B$ and $s^B$ are used as a control input to the constrained strapdown INS 47 during step 37. The constrained strapdown INS 47 integrates the IMU measurement data $\omega_{UB}^B$ and $s^B$ to determine the position, velocity and attitude of the IMU 26 relative to an Earth-Centred Earth-Fixed (ECEF) Cartesian coordinate frame-of-reference. Because the IMU 26 is strapped down to the vehicle 10, the position, velocity and attitude of the IMU 26 are equivalent to or closely related to the position, velocity and attitude of the vehicle 10, which are a part of the estimated state (e.g., $\tilde{x}$, $\hat{x}$) of the navigation filter 34.

The measurement data $s^B$ refers to the specific force resolved in a B-frame, which is a rotating frame-of-reference that is fixed with respect to the vehicle 10 that carries the IMU 26. The B-frame is represented by a right-handed Cartesian set of co-ordinate axes with origin located at the centre-of-mass of the IMU 26 which is itself strapped down rigidly to the vehicle 10. The B-frame includes an $x_1$ axis which is parallel to the centreline of the vehicle 10, and is therefore fixed relative to the vehicle 10. The measurement data $\omega_{IB}^B$ refers to the angular rate of the B frame relative to an I-frame resolved in the B frame. The I-frame is a Newtonian inertial frame of reference that is represented by a right-handed Cartesian set of axes with origin located at the centre of the Earth and coincident with the E-frame at some chosen reference epoch (e.g., $t=t_0$).

The term "constrained" in the name of the INS 47 means that, unlike conventional strapdown inertial navigation algorithms, the integration carried out by the INS 47 which determines the position of the IMU 26 based upon velocity data is modified through incorporation of the track constraint function $x^E(s)$ so that the final position produced is constrained to be on the curve of the track constraint function $x^E(s)$. This ensures that the state predictor 35 can never produce a position solution that lies off the track.

An example of the constrained strapdown INS 47 is illustrated in FIG. 6. The INS 47 outputs data 52, 62 and 63. Data 52, $R_B^I$, is the attitude (i.e., orientation) of the B-frame relative to the I-frame, which is equal to the attitude of the vehicle 10 relative to the I-frame. Data 62, $v_e^E$, is the velocity of the IMU 26 relative to the E-frame. Data 63, $r_e^E$, is the position of the IMU 26 relative to the E-frame.

The constrained strapdown INS 47 has a T-frame integrator 50, which integrates the IMU measurement data $\omega_{IB}^B$ and $s^B$ to calculate data 52 and a thrust inertial velocity $v_t^I$ of the IMU 26. The T-frame integrator 50 has an initial condition 51, which includes, for example, an initial value of a thrust inertial velocity of the IMU 26 and an initial value of an attitude rotation matrix resolving the I-frame coordinates into coordinates of a thrust velocity frame (i.e., the T-frame). The T-frame is an orthogonal right-handed co-ordinate frame-of-reference with axes parallel to those of the B frame. The translation of the origin of the T frame relative to the I-frame, i.e. the centre of the Earth, is defined to be the thrust velocity $v_t^I$.

The constrained strapdown INS 47 further comprises a G-frame integrator 53 which calculates a gravitational inertial velocity $v_g^I$ of the IMU 26, by integrating data 64, $\omega_{IE}^E$, which is the Earth's angular rate and $g^E$ which is the Earth's gravitation. $\omega_{IE}^E$ is a known parameter for the INS 47. $g^E$ is determined at block 65 using standard Earth models based upon the value of the data 63 previously calculated by an R-frame integrator 56.

The G-frame integrator 53 has an initial condition 54 which includes, for example, an initial value of the gravitational inertial velocity $v_g^I$ and an initial value of an attitude rotation matrix resolving coordinates of a gravitational velocity frame (i.e., the G-frame) into the I-frame coordinates. The G-frame is an orthogonal right-handed co-ordinate frame of reference with axes parallel to those of the E-frame. The translation of the origin of the G-frame relative to the I-frame is defined to be exactly the gravitational velocity $v_g^I$.

The T-frame integrator 50 and G-frame integrator 53 are not affected by the track constraint function $x^E(s)$, and may be implemented using well-known algorithms.

The thrust inertial velocity $v_t^I$ and the gravitational inertial velocity $v_g^I$ of the IMU 26 are then combined at an adder 55 to generate $v_i^I$ which is the true inertial velocity of the IMU 26. The true velocity of the IMU 26 $v_i^I$ data 52 and data 64 are then supplied to an R-frame integrator 56 for calculating data 62 and data 63.

The R-frame integrator 56 integrates the speed of the R-frame along the track, i.e., the first-order derivative S of the arc-length s along the tracks from a chosen reference point, and subsequently uses the integration of $\dot{S}$ with the track constraint function $x^E(s)$ to derive the velocity and the position of the IMU 26. The arc-length s is a function of time t.

$\dot{S}$ can be calculated according to Equation (1) as follows:

$$\dot{s}(t) = \hat{e}_{R1}^E(t) \cdot v_{ER}^E(t) = \hat{e}_{R1}^E(t) \cdot (v_e^E(t) - R_B^E(t)\omega_{EB}^B(t) \times r_{RB}^B) \tag{1}$$

In Equation (1), $$\hat{e}_{R1}^E(t) \equiv R_R^E(t)\begin{pmatrix}1\\0\\0\end{pmatrix} \tag{2}$$

$R_R^E(t)$ is an attitude rotation matrix resolving the coordinates of an R-frame into E-frame coordinates. The R-frame, is attached to a fixed point-of-reference on a bogie of the vehicle 10 and therefore moves along the associated shifted version of the track centreline. The R-frame has an $x_1$ axis which is parallel to the centreline of the track and points forward. The track constraint function $x^E(s)$ therefore gives the E-frame position co-ordinates of the R-frame and the tangent vector of the track constraint function $x^E(s)$ gives the R-frame's $x_1$ axis direction resolved in E-frame coordinates.

$R_B^E(t)$ is an attitude rotation matrix resolving B-frame coordinates into E-frame coordinates. $R_R^E(t)$ and $R_B^E(t)$ can be calculated using the integration products of the T-frame integrator 50 and the G-frame integrator 53.

In Equation (1), $v_e^E(t)$ is the latest value of data 62 calculated in the previous cycle by the R-frame integrator 56. Further, $r_{BB}^B$ represents the position of the B-frame relative to the R-frame resolved in the B-frame. $r_{RB}^B$ is modelled as a fixed lever-arm vector. In practice, the lever-arm vector may not be constant due to small rotations of the B-frame relative to the R-frame when, for example, the vehicle 10 travels around a bend and the IMU 26 is not mounted directly above the R-frame. Further, $\omega_{EB}^B(t)$ of Equation (1) can be calculated as follows:

$$\omega_{EB}^B(t) = \omega_{IB}^B(t) - R_E^B(t)\omega_{IE}^E(t) \tag{3}$$

$\omega_{IB}^B(t)$ is the IMU measurement data output by the IMU 26. $\omega_{IE}^E(t)$ is data 64.

Subsequently, the R-frame integrator 56 integrates $\dot{S}$ over time under an initial condition 57 to update the value of the arc-length s. The initial condition 57 includes an initial value of the arc-length s and/or the chosen reference point.

The track constraint function $x^E(s)$, represented by block 58, is supplied to the R-frame integrator 56. The E-frame position co-ordinates of the R-frame, i.e., $r_{ER}^E$, is equivalent to the value of the track constraint function $x^E(s)$ at the integrated value of $\dot{S}$. That is, $$r_{ER}^E = x^E(\int \dot{S} dt) \tag{4}$$

$r_{ER}^E$ can be further used to update the value of data 62 and data 63 according to Equations (5) and (6):

$$r_e^E(t) = r_{ER}^E(t) + R_B^E(t)r_{RB}^B \tag{5}$$

$$v_e^E(t) = R_I^E(t)v_i^I(t) - \omega_{IE}^E(t) \times r_e^E(t) \tag{6}$$

$R_I^E(t)$ is an attitude rotation matrix resolving the I-frame coordinates into the E-frame coordinates, and is determined by the G-frame integrator 53 since the axes of the G-frame are parallel to those of the E-frame.

Thus, the R-frame integrator 56 integrates the along-track speed of the IMU 26 to obtain distance travelled by the IMU 26 along the curve of the track constraint function $x^E(s)$ relative to a chosen reference point. The constrained strapdown INS 47 therefore encapsulates the time evolution function for the primary navigation sub-states of interest, namely: (i) the B-frame attitude relative to I-frame, i.e., data 52; (ii) the B-frame velocity relative to the I-frame, i.e., $v_i^I$; and (iii) the distance along-track of the R-frame, i.e., s(t).

Since the integration carried out by the R-frame integrator 56 incorporates the track constraint function $x^E(s)$, the position (i.e., data 63) of the IMU 26 determined by the INS 47 is constrained to be on the curve of the track constraint function $x^E(s)$. The position (i.e., data 63) of the IMU 26 is a part of the estimated state (e.g., $\tilde{x}$, $\hat{x}$) of the navigation filter 34.

The T-frame integrator 50 and the G-frame integrator 53 are executed in parallel. Each of the T-frame integrator 50 and the G-frame integrator 53 provides one updated data sample (including, $R_B^I$ (which is equal to $R_T^I$) and $v_t^I$ provided by the T-frame integrator 50, and $R_E^I$ (which is equal to $R_G^I$) and $v_g^I$ provided by the G-frame integrator 53) after receiving a number of incoming IMU data samples. This is referred to as a minor-loop update. The R-frame integrator 56 receives a number of data samples from the T-frame integrator 50 and the G-frame integrator 53 in order to complete an update cycle, which is referred to as major-loop update. Therefore, the R-frame integrator 56 is updated at a slower rate than the T-frame integrator 50 and the G-frame integrator 53.

As shown in FIG. 5, each of the sigma-points $\{\chi_i\}_{i=1}^{2N+1}$ generated at step 36 is passed through the constrained strapdown INS 47, which generates sigma points $\{\chi_i^+\}_{i=1}^{2N+1}$. The values of the sigma-points $\{\chi_i\}_{i=1}^{2N+1}$ provide at least a part of the initial conditions 51, 54 and 57.

The resulting sigma points $\{\chi_i^+\}_{i=1}^{2N+1}$ are subsequently used to calculate the mean of a new estimated state and its covariance, $\tilde{c}$, $\tilde{P}$ at steps 38, 39. This is based upon an assumption that the estimated state can be approximately by a Gaussian distribution.

The mean of a new estimated state and its covariance, $\tilde{x}$, $\tilde{P}$ (also referred to as an a priori estimate) are provided to the track constraint manager 32 to query the map database 24, such that the track constraint manager 32 dynamically provides an up-to-date track constraint function $x^E(s)$ in the vicinity of the estimated position of the vehicle 10 to the constrained strapdown INS 47.

If it is determined at step 41, after querying the data server 31, that there are no available non-IMU measurements, the new filter state mean and covariance, $\tilde{x}$, $\tilde{P}$ are processed at step 36 to generate a new set of sigma points $\{\chi_i\}_{i=1}^{2N+1}$ to initiate the state of the constrained strapdown INS 47.

State Updater 40

The state updater 40 is triggered to start an update step 33 based upon the a priori estimate z and its error covariance $\tilde{P}$, if non-IMU sensor measurement data is available from the data server 31.

The non-IMU sensor measurement data may be of different measurement types. For example, the non-IMU sensor measurement data may be provided by a wheel-, visual- or radar-odometer or a radar, which is a part of the sensor 27 providing reference positional information. Further or alternatively, the non-IMU sensor measurement data may be provided by a balise reader or a GNSS sensor, which is a part of the sensor 25 providing absolute positional information.

For each measurement type, the state updater 40 comprises a measurement model that characterises both the quality of the measurement and the functional relationship between the measurement and the state in the absence of measurement errors.

Thus, the state updater 40 creates at step 44 an appropriate measurement model for each measurement y from a particular non-IMU sensor. The created measurement model comprises: (i) R, the error covariance characterising the measurement noise process, assumed that the measurement noise has zero-mean and satisfies Gaussian distribution; and (ii) a function h(x) which maps the state space into the measurement space. By using the function h(x) and a state $\tilde{x}$, a predicted measurement $\tilde{y}$ can be calculated as $\tilde{y}=h(\tilde{x})$. The function h(x) may also be referred to as an observation model.

The measurement model may be created suitably, based upon the measurement type and the elements of the state.

Having created the function h(x), the unscented transform is again used within the update step 33 to compute the Kalman gain that is used to incorporate new information into the estimated state.

In particular, the state updater 40 constructs at step 42 a set of 2N+1 sigma points from the a priori estimate $\tilde{x}$ and its error covariance $\tilde{P}$. The set of sigma points are denoted as $\{\chi_i\}_{i=1}^{2N+1}$.

The state updater 40 subsequently propagates each of the sigma points $\{\chi_i\}_{i=1}^{2N+1}$ through the function h(x) to obtain a set of predicted measurement sigma points $\{\mathcal{Y}_i\}_{i=1}^{2N+1}$ at step 43. The measurement sigma points are calculated according to Equation (7):

$$\mathcal{Y}_i = h(\chi_i), i=1,2\ldots 2N+1 \quad (7)$$

The state updater 40 further calculates the Kalman gain, and the a posteriori estimate (i.e., the updated state estimate) at step 45, based upon the sigma points $\{\chi_i\}_{i=1}^{2N+1}$, $\{\mathcal{Y}_i\}_{i=1}^{2N+1}$, the non-IMU measurement data y, and the measurement noise R.

In particular, the state updater 40 calculates at step 45 an error covariance $\widetilde{P_y}$ of the predicted measurements using $\{\mathcal{Y}_i\}_{i=1}^{2N+1}$ and the measurement noise R. The state updater 40 further calculates at step 45 a cross covariance $\widetilde{P_{xy}}$ of the estimated state and the predicted measurement using $\{\chi_i\}_{i=1}^{2N+1}$ and $\{\mathcal{Y}_i\}_{i=1}^{2N+1}$.

The state updater 40 then calculates at step 45 the Kalman gain K based upon the error covariance $\widetilde{P_y}$ and the cross covariance $\widetilde{P_{xy}}$ according to Equation (8):

$$K = \widetilde{P_{xy}} \widetilde{P_y}^{-1} \quad (8)$$

The difference between the measurement y and the mean (denoted by $\tilde{y}$) of the sigma points $\{\mathcal{Y}_i\}_{i=1}^{2N+1}$ is called "innovation". The innovation encapsulates the new information introduced into the update step 33. The innovation is used in conjunction with the Kalman gain and the a priori estimate $\tilde{x}$ and its error covariance $\tilde{P}$ to compute the a posteriori estimate $\hat{x}$ and its error covariance $\hat{P}$. In particular, the a posteriori estimate $\hat{x}$ and its error covariance $\hat{P}$ are calculated according to Equations (9) and (10).

$$\hat{x} = \tilde{x} + K(y - \tilde{y}) \quad (9)$$

$$\hat{P} = \tilde{P} - K\widetilde{P_y}K^T \quad (10)$$

The track constraint function $x^E(s)$ may be further exploited during the update step. How this is done is dependent upon the application and whether the constraint can be treated as absolute or approximate. For example, if the vehicle 10 is a train and vibration of the vehicle 10 is ignored, the orientation of the train travelling along a railway track can be determined from the track constraint function $x^E(s)$ which represents the centreline of the track and the position of the train. It would be appreciated that only pitch and yaw of the train can be determined from the track constraint function $x^E(s)$, but not roll. Roll, however, can be constrained to a certain degree if the cant of the train tracks is also incorporated into the map database 24. It would be understood that the cant of the tracks may only provide a part of the total roll of the train because the train tends to roll on its suspension when travelling around bends. Hence, a very accurate pseudo-measurement of the attitude (in particular, the pitch and yaw components of the attitude) of the train can be derived based upon the track constraint function $x^E(s)$ and the estimated position of the train indicated in the a priori estimated state $\tilde{x}$. The roll component of the attitude may also be estimated by imposing a dynamical constraint—e.g., a train stays on the track and therefore the only acceleration acting is centripetal acceleration.

The pseudo-measurement of the attitude of the train is essentially the direction of the $x_1$ axis of the B-frame from the track constraint function $x^E(s)$ given the arc-length parameter s. The pseudo-measurement may be constructed from the tangent and curvature values of the track constraint function $x^E(s)$ at an estimated position (which is a part of the estimated state $\tilde{x}$) of the train.

The term "pseudo" means that the measurement is not a real measurement obtained from any of the sensors 25, 27, but is used as a measurement together with the non-IMU sensor measurement in the update step. In particular, the pseudo-measurement of the attitude of the train may be supplied to the state updater 40 as a measurement y. The state updater 40 computes the measurement model h(x) for the pseudo-measurement at step 44, and the pseudo-measurement is used to compute the Kalman gain K and the a posteriori estimate $\hat{x}$ and its error covariance $\hat{P}$.

It would be appreciated that if the vehicle 10 is a car and the transport network is a road network, a similar pseudo-measurement of the attitude of the car can also be applied to the state updater 40, but with less accuracy because cars have greater freedom and higher manoeuvrability within the road network.

For implementation purpose, an update of the pseudo-measurement of the attitude may be applied intermittently. For example, an update of the pseudo-measurement of the attitude may be applied together with every visual odometer measurement update.

The utilisation of the track constraint function $x^E(s)$ within both of the prediction and the update steps 30, 33 of the navigation filer 34 as described above constitutes optimal use of the track constraint information. By imposing the track constraint function $x^E(s)$ in the constrained strapdown INS 47, the evolution of the estimate of the position of the vehicle 10 is always consistent with one-dimensional motion along the track centreline represented by the track constraint function $x^E(s)$, and the state prediction (e.g., $\tilde{x}$) and the propagation of the state estimate errors (e.g., P) generated by the state predictor 35 are kept consistent with the track constraint function $x^E(s)$. By further imposing the track constraint function $x^E(s)$ as a pseudo-measurement in the update step, the state updater 40 only adjusts the estimate of the position of the vehicle 10 along the track centreline represented by the track constraint function $x^E(s)$. The track constraint function $x^E(s)$ improves both the mean of the estimated state (e.g., $\tilde{x}$, $\hat{x}$) and the associated error covariance (e.g., $\tilde{P}$, $\hat{P}$).

Route Disambiguation

Figure 12:
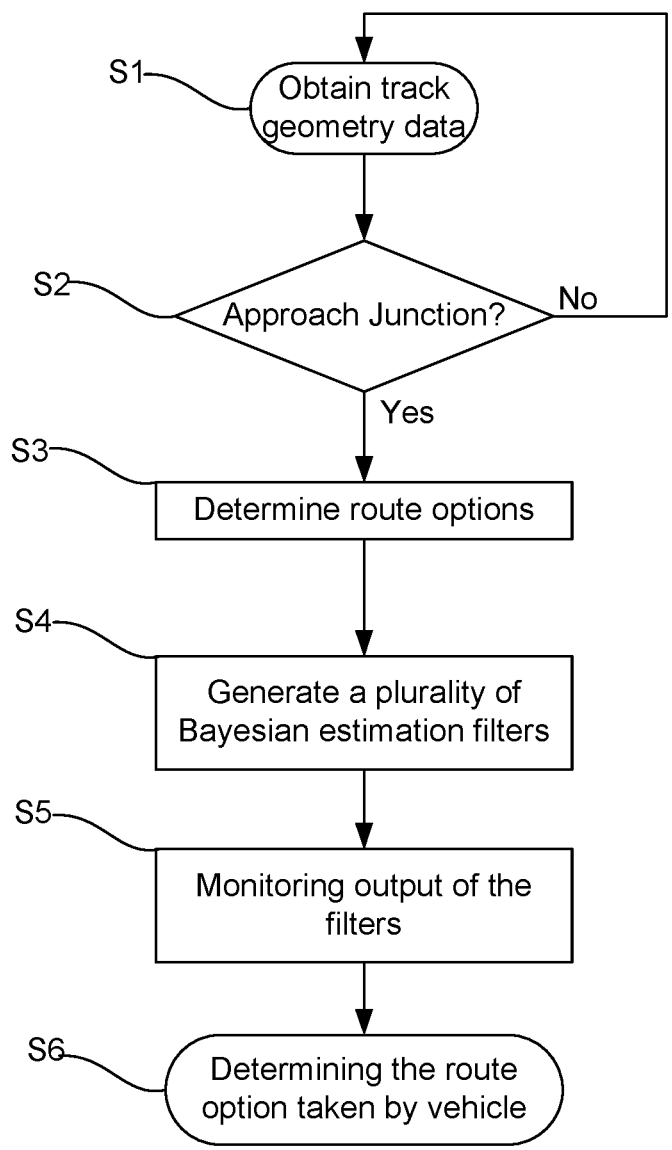
FIG. 12 is a flowchart of example processing steps that may be carried out by the controller of FIG. 4 in order to resolve the route option taken by the vehicle through the junction.

The controller 9 further carries out processing steps for determining a route which the vehicle 10 takes through a junction of the transport network. The processing steps are shown in FIG. 12 and described below.

At step S1, the controller 9 (in particular, the track-constraint manager 32 of FIG. 5) obtains the track geometry data (e.g., the track constraint function $x^E(s)$ and/or the network topology stored in the map database 24) which indicates the track geometry of at least a part of the transport network in the vicinity of the vehicle 10. The track constraint function $x^E(s)$ is obtained on-the-fly dynamically based upon the current position of the vehicle 10. The current position of the vehicle 10 may be an initial position of the vehicle 10, with the initial position being determined by the sensor 25 which provides information indicating an absolute position of the vehicle 10, Alternatively, the current position of the vehicle 10 may be the latest estimated position of the vehicle 10 indicated within the estimated state $\tilde{x}$ output by the state predictor 35.

At step S2, the controller 9 determines whether the vehicle 10 is approaching a network junction based upon the track constraint function $x^E(s)$ and an estimated position of the vehicle 10. The estimated positon is generated by the navigation filter 34 of FIG. 5 as described above.

In the example of FIG. 1, the vehicle 10 is moving downwards from the vertex 3 to the vertex 4, and vertex 4 is a network junction because it provides two possible route options. Based upon the track constraint function $x^E(s)$ and the movement direction of the vehicle 10, the controller 9 determines that the vehicle 10 is approaching a network junction represented by the vertex 4. The movement direction of the vehicle 10 may be directly measured by the sensors 25, 27, or alternatively may be indicated in the estimated state $\tilde{x}$ output by the state predictor 35.

If it is determined at step S2 that the vehicle 10 is not approaching a network junction, steps S1 and S2 would be repeated until it is determined that the vehicle 10 is approaching a network junction.

If it is determined at step S2 that the vehicle 10 is approaching a network junction, the processing moves to step S3 where the controller 9 determines the route options from the network junction. The route options may be determined based upon the network topology stored in the map database 24, in particular, the instances of the Edge Connections 20. In the example of FIG. 1, the controller 9 queries the map database 24 and determines that the network junction (i.e., the vertex 4) provides a first route option towards the vertex 5 and a second route option towards the vertex 6. Subsequently, the controller 9 may obtain the track constraint function $x^E(s)$ which indicates the track geometry of each of the route options separately.

At step S4, the controller 9 generates a plurality of Bayesian estimation filter algorithms each associated with a possible route option determined at step S3. Each of the plurality of Bayesian estimation filter algorithms provides a navigation solution (including an estimated position of the vehicle 10) which is constrained by the track geometry data indicative of the associated route option.

In an example, the plurality of Bayesian estimation filter algorithms may be copies of the navigation filter 34. That is, the controller 9 generates a first copy of the navigation filter 34 which estimates the position of the vehicle 10 based upon the track constraint function $x^E(s)$ indicating the first route option towards the vertex 5 (as if the second route option does not exist). The controller further generates a second copy of the navigation filter 34 which estimates the position of the vehicle 10 based upon the track constraint function $x^E(s)$ indicating the second route option towards the vertex 6 (as if the first route option does not exist).

Figure 8:
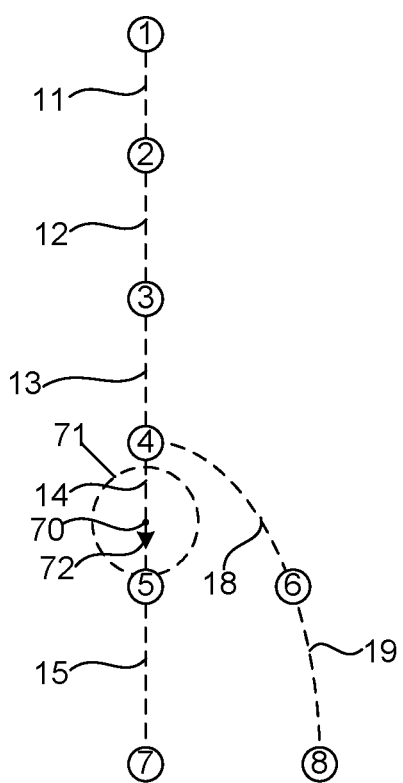
FIG. 8 schematically illustrates a hypothesis of the vehicle taking a first route option presented by the junction.

FIG. 8 schematically illustrates the result provided by the first copy of the navigation filter 34. The first copy estimates that the position of the vehicle 10 is at position 70 with an error range of 71.

Figure 9:
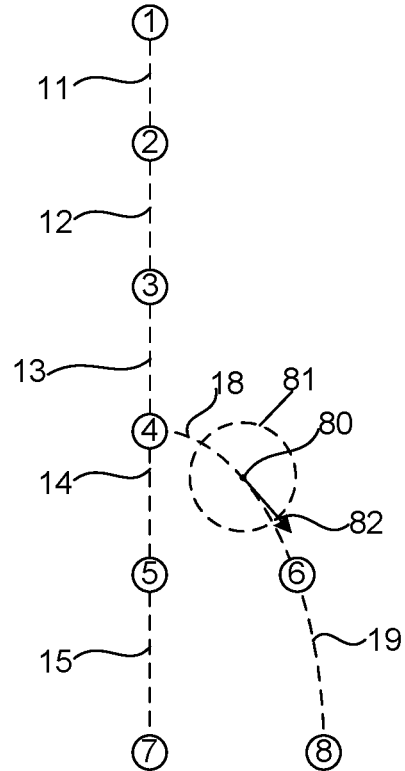
FIG. 9 schematically illustrates a hypothesis of the vehicle taking a second route option presented by the junction.

FIG. 9 schematically illustrates the result provided by the second copy of the navigation filter 34. The second copy estimates that the position of the vehicle 10 is at position 80 with an error range of 81.

Because the navigation filter 34 would not produce an estimated position of the vehicle 10 which is off the track defined by the track constrained function, the estimated positions 70, 80 lie on the route options associated with the copies of the navigation filter 34.

Based upon the estimated position of the vehicle 10, each copy of the navigation filter 34 further determines the supposed moving direction of the vehicle 10 (i.e., the pseudo-measurement of the attitude of the vehicle as described above). The pseudo-measurement may be calculated as a tangent of the track constraint function $x^E(s)$ at the estimated position of the vehicle 10, and may also be referred to as an "attitude pseudo-measurement".

In the example of FIG. 8, the first copy of the navigation filter 34 determines that the pseudo-measurement of the attitude of the vehicle 10 is along arrow 72. In the example of FIG. 9, the second copy of the navigation filter 34 determines that the pseudo-measurement of the attitude of the vehicle 10 is along arrow 82.

The pseudo-measurements are fed into each copy of the navigation filter 34 as a part of the measurement y. Therefore, the innovation value output by each copy of the navigation filter is affected by the value of the respective pseudo-measurement.

As described above, the innovation represents a difference between the estimated state and the measurement. The difference is small when the estimated state resembles the true state which is observed by the measurement. Conversely, the difference is large when the estimated state differs from the true state. It would be understood that if, for example, the vehicle 10 indeed takes the first route option towards the vertex 5, then the pseudo-measurement 72 would approximate the real attitude of the vehicle 10. Thus the innovation of the first copy of the navigation filter 34 would have a small value. If, for example, the vehicle 10 takes the second route option towards the vertex 6, then the pseudo-measurement 72 would significantly differ from the real attitude of the vehicle 10. Thus, the innovation of the first copy of the navigation filter 34 would have a greater value.

Therefore, the innovation values output by the plurality of Bayesian estimation filter algorithms indicate probabilities of the vehicle 10 taking the respective route option provided by the network junction.

The plurality of Bayesian estimation filter algorithms may be executed in parallel. In one example, the plurality of Bayesian estimation filter algorithms are implemented as separate threads running in parallel. In an alternative example, the plurality of Bayesian estimation filter algorithms are implemented on separate processors. In any event, each one of the plurality of Bayesian estimation filter algorithms is synchronised with the measurements of the sensors 25, 27.

At step S5, the controller 9 monitors the output (in particular, the innovation values) of the plurality of Bayesian estimation filter algorithms when the vehicle 10 moves through the junction. That is, each of the plurality of Bayesian estimation filter algorithms recursively predicts the position of the vehicle 10 based upon the IMU measurements and the track constraint function indicative of the associated route option, determines the attitude pseudo-measurement of the vehicle 10 at the predicted position, and calculates the innovation value during the update phase based upon the predicted position, the attitude pseudo-measurement and the non-IMU sensor measurements.

In practice, because it is unknown how long it would take the vehicle 10 to move through the junction, the controller 9 may monitor the output of the plurality of Bayesian estimation filter algorithms for a fixed time period. The fixed time period is set to be long enough for a vehicle to cross a junction. Alternatively, the controller 9 may monitor the output of the plurality of Bayesian estimation filter algorithms until the output clearly diverge from one another.

Figure 10:
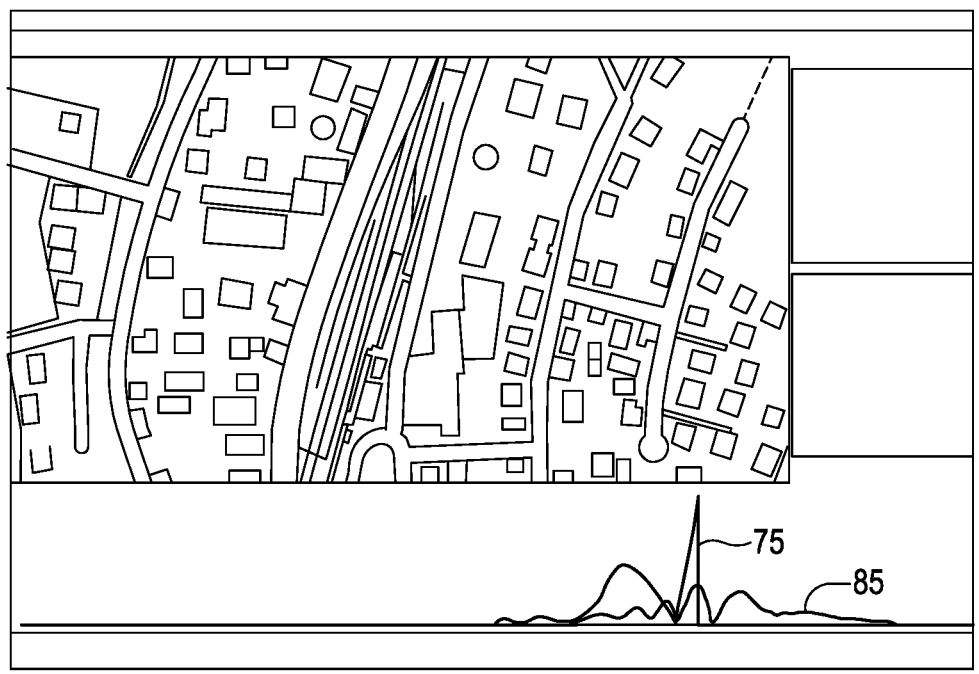
FIG. 10 illustrates the calculated probabilities of the hypotheses of FIGS. 8 and 9 when the vehicle takes the second route option.
Figure 11:
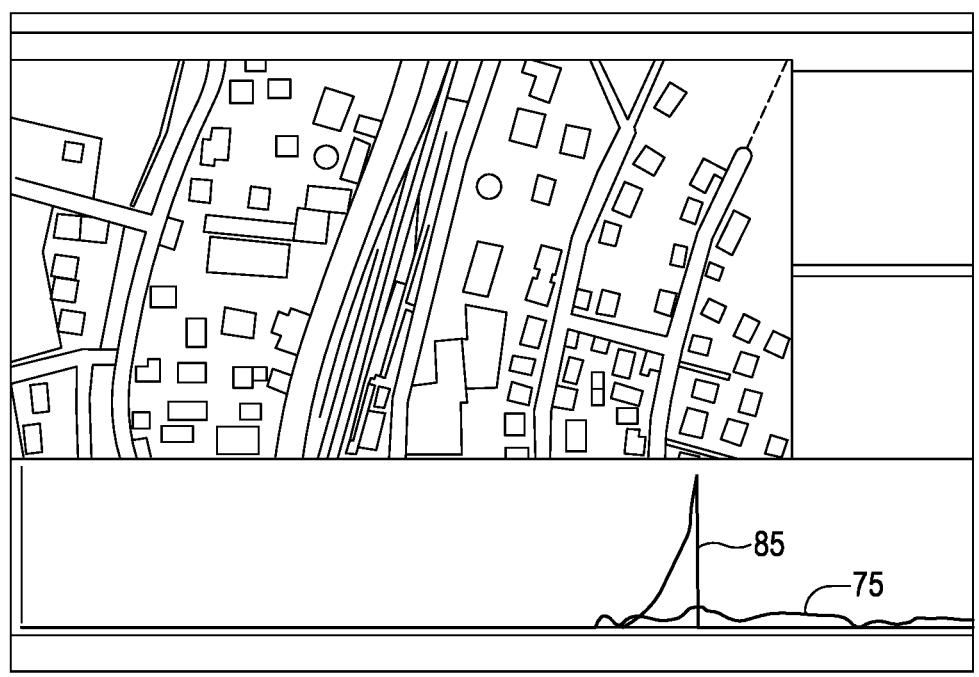
FIG. 11 illustrates the calculated probabilities of the hypotheses of FIGS. 8 and 9 when the vehicle takes the first route option.

FIGS. 10 and 11 show the plots of the innovation values calculated by the first copy and the second copy of the navigation filter 34. The Y axis of each plot indicates the magnitude of the innovation values. The X axis of each plot represents time. Curve 75 is output by the first copy of the navigation filter 34 which is assigned to the first route option towards the vertex 5. Curve 85 is output by the second copy of the navigation filter 34 which is assigned to the second route option towards the vertex 6. In FIG. 10, the vehicle 10 takes the second route option. In FIG. 11, the vehicle 10 takes the first route option.

From these plots, it is clear that the innovation value for the correct route is significantly lower than that of the incorrect route.

At step S6, the controller 9 determines the route option taken by the vehicle 10 by selecting one of the plurality of route options which presents the highest probability based upon the output of the plurality of Bayesian estimation filter algorithms.

In an example, the controller 6 selects the route option which provides the lowest average innovation value over a time period during which the vehicle 10 passes through the network junction.

In another example, after each attitude pseudo-measurement is obtained, the controller 9 compares the innovations output by the plurality of Bayesian estimation filter algorithms against thresholds. For the algorithms which provide innovations above the thresholds, the controller 9 determines that the vehicle 10 is unlikely to take the route options which those algorithms are associated with. Those unlikely route options would be withdrawn from consideration and those Bayesian estimation filter algorithms associated with those unlikely route options would be culled. The remaining route option after the network junction has been traversed has the highest probability for the vehicle 10 to take. If the vehicle 10 has travelled a predetermined distance after passing the junction, and there are still more than one route options which do not produce innovations above the thresholds, then the route option which provides the lowest average innovation value is selected.

In the plot shown in FIG. 10, it is clear that curve 85 output by the second copy of the navigation filter 34 achieves lower innovation values. Therefore, the controller 9 would determine that the vehicle has taken the second route option towards the vertex 6 after passing the junction.

In the plot shown in FIG. 11, it is clear that curve 75 output by the first copy of the navigation filter 34 achieves lower innovation values. Therefore, the controller 9 would determine that the vehicle has taken the first route option towards the vertex 5 after passing the junction. The results are consistent with the actual route taken by the vehicle 10 as shown in the upper parts of FIGS. 10 and 11.

After the route taken by the vehicle 10 is determined, the controller 9 keeps the Bayesian estimation filter algorithm associated with the determined route for further processing (e.g., for repeating the processing steps of FIG. 12). The Bayesian estimation filter algorithms associated with the incorrect route options are terminated or deleted to save computational resources of the controller 9.

The processing steps shown in FIG. 12 do not rely upon the absolute positions of the vehicle 10 to disambiguate the route taken by the vehicle 10 through a network junction. Rather, the above described processing steps calculate the probabilities of the vehicle taking each possible route option, by generating a plurality of Bayesian estimation filter algorithms each associated with a respective one of the plurality of route options and comparing the innovation values generated by the algorithms. The innovation values represent the probabilities of the vehicle taking the respective route option. The innovation values for the correct route option which is actually taken by the vehicle 10 are significantly lower than that of other route options. The innovation values are calculated using a pseudo-measurement of an attitude of the vehicle 10 formed from knowledge of the track geometry (e.g., the track constraint function) at the estimated position of the vehicle 10. In this way, by comparing the innovation values generated by the algorithms, the most likely route option taken by the vehicle 10 through the network junction is resolved.

The processing steps shown in FIG. 12 do not rely upon the provision of track-side infrastructure to disambiguate the route option taken by the vehicle 10 through a junction, and therefore can determine the route when track-side infrastructure is unavailable in the locality of a network junction. This permits for seamless travel of the vehicle 10 through the junction. Further, the processing steps shown in FIG. 12 allows for a significant cost saving to the network operator in terms of procurement, installation and maintenance of track-side infrastructure.

It would be appreciated that the plurality of Bayesian estimation filter algorithms generated at step S4 may take a different form other than the navigation filter 34 shown in FIG. 5.

In particular, the plurality of Bayesian estimation filter algorithms generated at step S4 may be extended Kalman filter, unscented Kalman filter, or any other suitable type of Bayesian estimation filter algorithms, as long as algorithms are able to fuse the sensor data output by the sensors 25, 27 and to estimate a state (including the position and attitude) of the vehicle 10 based upon the sensor data. FIG. 12 illustrates the general working principle of a Bayesian estimation filter algorithm suitable for use by the techniques described herein. The Bayesian estimation filter algorithm includes a system model M 100, an observation model h 101 and a Kalman gain K 103. The Bayesian estimation filter algorithm uses an observation or measurement y (e.g., sensor data output by at least one of the sensors 25, 27) to estimate a state x̃ (including the position and attitude) of the vehicle 10. The observation model h 101 maps the state space into the observed space (i.e., measurement space). The difference between the observation y and the estimated state x̃ after being mapped into the observed space using the model h is calculated at an adder 102 to generate an innovation value I. The innovation I is amplified by the Kalman gain K 103 and the amplified result is fed back into the system model M 100 for recursive processing.

The track constraints defined in track geometry data (e.g., the track constraint function) may be imposed suitably to the Bayesian estimation filter algorithm, such that the estimated positions of the vehicle provided by the Bayesian estimation filter algorithm lies along a track defined by the track constraint function.

Constraining the Bayesian estimation filter algorithm with track constraints may be achieved in various ways. In an example, the final estimated position (unconstrained) output by the algorithm may be orthogonally projected onto the tracks defined by the track geometry data so as to obtain a constrained solution. The strapdown INS 47 described above and shown in FIG. 6 provides an alternative example.

Figure 13:
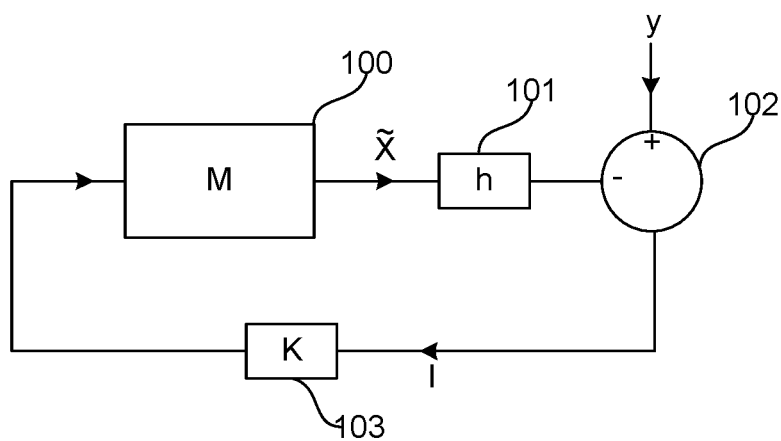
FIG. 13 schematically illustrates a general structure of a Bayesian estimation filter executable by the controller of FIG. 4 for estimating a position of the vehicle.

In an example, the state space and the measurement space of the Bayesian estimation filter algorithm of FIG. 13 (and navigation filter 34 of FIG. 5) may be Euclidean vector space, in particular N-dimensional Euclidean vector-space. That is, the state (e.g., x̃, x̂) and its error covariance (e.g., P̃, P̂) as well as the measurement y are represented as Euclidean vectors.

In an alternative example, the state (e.g., x̃, x̂) and its error covariance (e.g., P̃, P̂) as well as the measurement y are represented as elements of Lie groups (in particular, matrix Lie groups). The working principle of the Bayesian estimation filter algorithm of FIG. 13 (and navigation filter 34 of FIG. 5) is not affected by the use of Lie groups. The details of Lie groups, Lie algebras, and the implementation of a sensor fusion algorithm (e.g., the navigation filter 34) using the machinery of Lie groups are known from references [3] to [6].

It is advantageous to represent the state and the measurement using matrix Lie groups, because matrix Lie groups can easily represent a complex state which comprises multiple sub-states using a product matrix Lie group. The product matrix Lie group encapsulates the typological structure of the state space. In contrast, the topological structure of the state space may be lost in the process of translating a state model into an N-dimensional Euclidean vector-space.

The processing steps shown in FIG. 12, the Bayesian estimation filter algorithm of FIG. 13, and navigation filter 34 of FIG. 5 may be implemented in C++ language or any other suitable programming language.

In the example provided by FIG. 5, the navigation filter 34 is implemented as an unscented Kalman filter. It would be appreciated that the navigation filter 34 may be implemented using a different type of the Bayesian estimation filter, such as, extended Kalman filter, etc.

Although the above description has set out preferred embodiments, it should be understood that these embodiments are illustrative only and that the claims are not limited to those embodiments. Those skilled in the art will be able to make modifications and alternatives in view of the invention which are contemplated as falling within the scope of the appended claims. Each feature disclosed or illustrated in the present specification may be incorporated in the embodiments, whether alone or in any appropriate combination with any other feature disclosed or illustrated herein.

REFERENCES

[1] Van der Merwe R., Wan E., Julier S., Sigma-point Kalman filters for non-linear estimation and sensor fusion: application to integrated navigation, proceedings of American Institute of Aeronautics and Astronautics (AIAA) Guidance, Navigation and Control conference and exhibition, August 16th-19th, Providence, R.I., 2004.
[2] Van der Merwe R., Wan, Sigma-point Kalman filters for probabilistic inference in dynamic state-space models, proceedings of the Workshop on Advances in Machine Learning, June 8th-11th, Montreal, Canada, 2003.
[3] Hall B. C., Lie groups, Lie algebras and representations: An elementary introduction, Graduate Texts in Mathematics 222 (2nd ed.), Springer, ISBN 0-387-40122-9, 2015.
[4] Iwasawa K., On the representation of Lie algebras, Japanese Journal of Mathematics, Nos. 19, 1948, pp. 405-426.
[5] Hertzberg C., Wagner R., Frese U. and Schroder L., Integrating Gweneric Sensor Fusion Algorithms with Sound State Representations through Encapsulation of Manifiolds, Information Fusion, Vol. 14, Issue 1., January 2013, pp. 57-77.
[6] Fletcher P. T., Lu, C., and Joshi, S., Statistics of Shape via Principal Component Analysis on Lie Groups, Proceedings of IEEE Conference on Computer Vision and Pattern Recognition, 2003, pp. 95-101.

The invention claimed is:
1. A computer-implemented method of determining a position of a vehicle within a transport network and determining a route option taken by the vehicle, comprising:
obtaining track geometry data indicating track geometry of at least a part of the transport network;
determining, based upon the track geometry data and sensor data from at least one sensor arranged to output a signal indicative of a motion of the vehicle, that the vehicle is approaching a junction, wherein the at least one sensor comprises an inertial measurement unit, IMU, and a sensor other than an IMU;
determining, based upon the track geometry data, a plurality of route options from the junction;
generating a plurality of Bayesian estimation filter algorithms each associated with a respective one of the plurality of route options and configured to estimate a position of the vehicle based upon the track geometry data indicative of the associated route option, the plurality of Bayesian estimation filter algorithms being configured to estimate a position of the vehicle based upon the output signal of the at least one sensor, wherein the plurality of Bayesian estimation filter algorithms are configured to output data indicative of probabilities of the vehicle taking the associated route options, the output data comprising innovation values calculated by the plurality of Bayesian estimation filter algorithms based upon pseudo-measurements of the associated route options, the pseudo-measurements of the associated route options being determined based upon the track geometry data indicative of the associated route options;

monitoring the output of the plurality of Bayesian estimation filter algorithms as the vehicle passes through the junction; and determining the route option taken by the vehicle by selecting one of the plurality of route options which presents the highest probability based upon the output of the plurality of Bayesian estimation filter algorithms;

wherein a first one of the Bayesian estimation filter algorithms is executed to:

predict a position of the vehicle in a prediction step based at least upon a first sensor data output by the IMU and the track geometry data such that the predicted position of the vehicle lies on a track defined by the track geometry data; and update the predicted position of the vehicle in an update step based at least upon a second sensor data output by the sensor other than an IMU, and wherein the estimated position of the vehicle is based upon at least one of the predicted position and the updated predicted position of the vehicle.

2. A computer-implemented method according to claim 1, wherein the pseudo-measurements comprise a pseudo-measurement of an attitude of the vehicle along a track defined by the track geometry data indicative of one of the route options.

3. A computer-implemented method according to claim 2, wherein the pseudo-measurement of the attitude of the vehicle is calculated based upon a tangent of the track defined by the track geometry data at the estimated position of the vehicle.

4. A computer-implemented method according to claim 1, wherein the plurality of Bayesian estimation filter algorithms are configured to calculate the innovation values based upon the pseudo-measurements of the associated route options and the respective estimated positions of the vehicle.

5. A computer-implemented method according to claim 1, wherein selecting one of the plurality of route options which presents the highest probability comprises selecting one of the plurality of route options which achieves the lowest innovation value.

6. A computer-implemented method according to claim 1, wherein selecting one of the plurality of route options which presents the highest probability comprises:

comparing the innovation values calculated by the plurality of Bayesian estimation filter algorithms against a predetermined threshold value, and selecting one of the plurality of route options which presents an innovation value below the predetermined threshold value.

7. A computer-implemented method according to claim 1, wherein the plurality of Bayesian estimation filter algorithms are configured such that the estimated positions of the vehicle lie along the associated route options indicated by the track geometry data.

8. A computer-implemented method according to claim 1, wherein the plurality of Bayesian estimation filter algorithms are executed in parallel to one another.

9. A computer-implemented method according to claim 1, wherein determining that the vehicle is approaching a junction of the transport network comprises:

executing a first Bayesian estimation filter algorithm to estimate a position of the vehicle based upon the track geometry data; and determining that the estimated position of the vehicle is approaching a junction of the transport network.

10. A computer-implemented method according to claim 1, wherein generating a plurality of Bayesian estimation filter algorithms comprises: generating a plurality of copies of the first Bayesian estimation filter algorithm.

11. A computer-implemented method according to claim 10, further comprising:

executing at least one copy of the first Bayesian estimation filter algorithm in an update step to update the predicted position of the vehicle based at least upon the second sensor data and the pseudo-measurement of the associated route option.

12. A computer-implemented method according to claim 10, further comprising: deleting copies of the first Bayesian estimation filter algorithm which are associated with the unselected route options.

13. A computer-implemented method according to claim 1, wherein the plurality of Bayesian estimation filter algorithms comprise an unscented Kalman filter.

14. A computer-implemented method according to claim 1, wherein obtaining the track geometry data comprises:

accessing a map database, wherein the map database comprises sample points positioned along tracks within the transport network;

retrieving from the map database sample points in the vicinity of the vehicle; and applying an interpolation function through the retrieved sample points to obtain a track constraint function, wherein the track geometry data comprises the track constraint function.

15. A computer-implemented method according to claim 14, wherein the track constraint function comprises a twice differentiable curve with a continuous second-order derivative at least one of the retrieved sample points.

16. A computer-implemented method according to claim 14, wherein the interpolation function comprises a cubic spline function.

17. A computer-implemented method according to claim 1, wherein the vehicle comprises one of a train or a tram.

18. A computer program comprising computer readable instructions configured to cause a computer to carry out a method according to claim 1.

19. A non-transitory computer readable medium carrying a computer program according to claim 18.

20. An apparatus for determining a position of a vehicle within a transport network, comprising:

a memory storing processor readable instructions; and a processor arranged to read and execute the processor readable instructions stored in the memory, wherein the processor readable instructions comprise instructions arranged to control the processor to carry out a method according to claim 1.

* * * * *